United States Patent [19]

Kobayashi et al.

[11] Patent Number: 5,896,371
[45] Date of Patent: Apr. 13, 1999

[54] BROADBAND SWITCHING NETWORKS

[75] Inventors: Hiroshi Kobayashi, Tokyo; Yoshiharu Hidaka, Kanagawa-ken; Kazuo Aida, Tokyo; Takashi Ikeda, Kanagawa-ken; Motomitsu Yano; Kouichirou Kamura, both of Saitama-ken, all of Japan

[73] Assignee: Kabushiki Kaisha Toshiba, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,761

[22] Filed: Apr. 19, 1996

Related U.S. Application Data

[62] Division of application No. 07/736,282, Jul. 25, 1991, Pat. No. 5,825,766.

[30] Foreign Application Priority Data

Jul. 27, 1990 [JP] Japan .................................. 2-199948

[51] Int. Cl.$^6$ .................................................. H04L 12/56
[52] U.S. Cl. ........................................ 370/232; 370/395
[58] Field of Search ........................... 370/60, 60.1, 61, 370/94.1, 94.2, 94.3, 229, 230, 231, 232, 235, 252, 389, 395, 340, 535, 536, 353, 538, 540, 541, 542, 253, 537, 455, 445, 459, 442, 468, 471, 397

[56] References Cited

U.S. PATENT DOCUMENTS

| | | |
|---|---|---|
| 4,896,316 | 1/1990 | Lespagnol et al. . |
| 4,905,225 | 2/1990 | Francois et al. . |
| 4,905,231 | 2/1990 | Leung et al. ............................ 370/400 |
| 4,947,388 | 8/1990 | Kuwahara et al. . |
| 4,964,119 | 10/1990 | Endo et al. . |
| 4,979,164 | 12/1990 | Ardon ................................... 370/422 |
| 5,029,164 | 7/1991 | Goldstein et al. ....................... 370/235 |
| 5,084,877 | 1/1992 | Netravali et al. . |
| 5,138,607 | 8/1992 | Thiebaut et al. . |
| 5,140,417 | 8/1992 | Tanaka et al. . |
| 5,150,358 | 9/1992 | Pung et al. . |
| 5,163,042 | 11/1992 | Ochiai . |
| 5,258,979 | 11/1993 | Oomuro et al. . |
| 5,422,881 | 6/1995 | May et al. ............................. 370/60 |
| 5,440,548 | 8/1995 | Denissen ............................... 370/60 |
| 5,446,734 | 8/1995 | Goldstein . |

FOREIGN PATENT DOCUMENTS

| | | |
|---|---|---|
| 2-132188 | 11/1989 | Japan . |
| 2-170645 | 7/1990 | Japan . |

OTHER PUBLICATIONS

Koinuma et al., "An ATM Switching System Based on a Distributed Control Architecture," INT. Switching Symposium 1990, Stockholm, vol. 5, pp. 21–26, May 28–Jun. 1, 1990.

Ghanbari, "Two–Layer Coding of Video Signals for VBR Networks," IEEE Journal on Selected Area in Communications, vol. 7, No. 5, pp. 771–781, Jun. 1989.

N. Endo et al., "Shared Buffer Type Memory Switch for ATM Switching Network", Journal of the Institute of Electronic, Information, and Communication Engineers of Japan, B–1 vol. J72–B–1, No. 11, Nov. 1989, pp. 1062–1069.

W. Wang et la., "Bandwidth Allocation for ATM Networks", IEEE International Conference on Communications ICC'90, vol. 2, Apr. 1990, pp. 439–442.

H. Ohnishi et al., "Flow Control Schemes and Delay/Loss Tradeoff in ATM Networks", IEEE Journal on Selected Areas in Communications, vol. 6, No. 9, Dec. 1988, Dec. 1988, pp. 1609–1616.

*Primary Examiner*—Dang Ton
*Attorney, Agent, or Firm*—Finnegan, Henderson, Farabow, Garrett, & Dunner, L.L.P.

[57] ABSTRACT

Broadband switching networks are disclosed, which have a plurality of broadband switch nodes and a broadband switch inter-node transmission line for connecting the plurality of broadband switch nodes, information being transmitted by cells, each of which comprises a header and an information field, wherein the broadband switch nodes comprise a broadband input and output port for inputting and outputting the cells to and from the broadband inter-node transmission line, and a switch for separating the cells being input through the broadband input and output port and for multiplexing the cells so as to output the cells, wherein data composed of the plurality of cells is transmitted and received through the broadband switch nodes by constant bit rate transmission, variable bit rate transmission, or a combination of the constant bit rate transmission and the variable bit rate transmission.

10 Claims, 24 Drawing Sheets

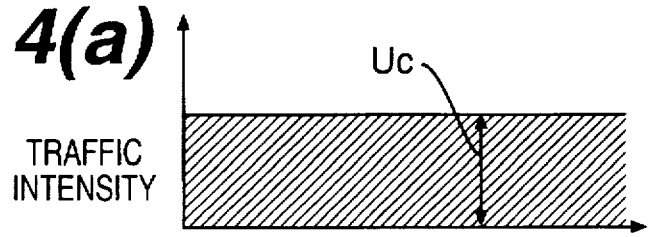
(A) CIRCUIT EMULATION COMMUNICATION (CLASS A)
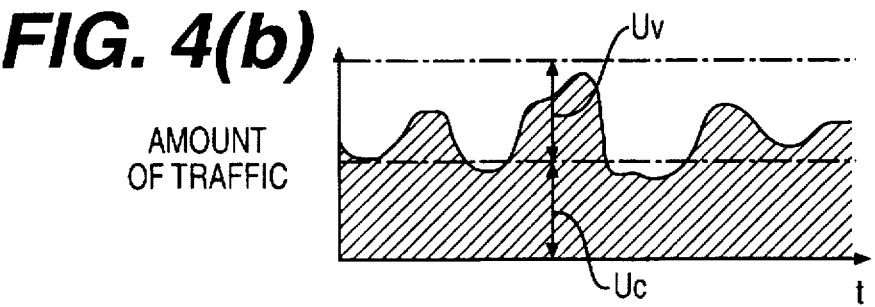
(B) VARIABLE BIT RATE PICTURE COMMUNICATION (CLASS B)
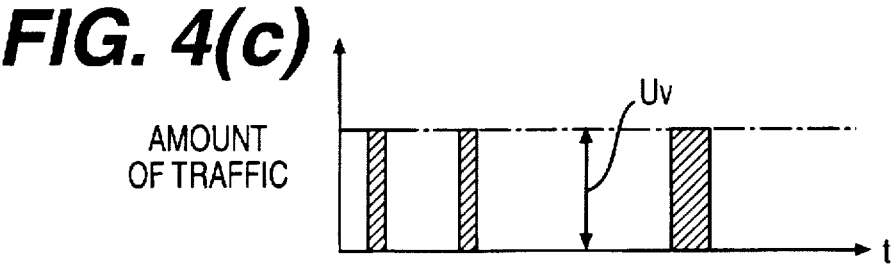
(C) CONNECTION ORIENTED DATA COMMUNICATION (CLASS C)
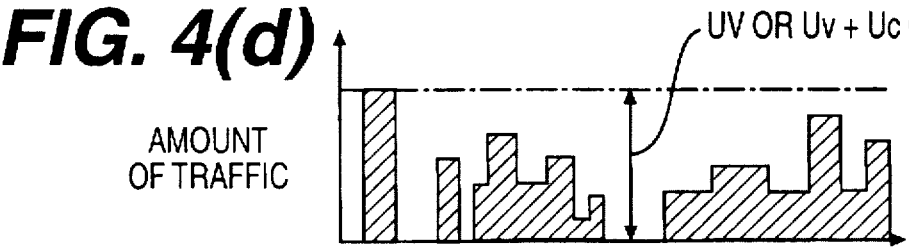
(D) SUPPORT OF CONNECTION DATA COMMUNICATION (CLASS D)

EXAMPLE OF CBR CELL TRANSMISSION SEQUENCE

SUSPEND/RESUME PROCEDURES

SWITCHING NODE 2A (FROM 2A TO 2B)

| VPI | 4ab | | | | | 36ab |
|---|---|---|---|---|---|---|
| CRi | TEIj | VCIk | Uc | Uv | CLASS | CALL STATE |
| CR$_1$ | TEIa | VCI$_1$ | — | 10 | 3 | |
| CR$_2$ | TEIc | VCI$_2$ | — | 20 | 3 | 10:31:02 |
| CR$_3$ | TEIc | VCI$_3$ | 5 | — | 1 | |
| CR$_4$ | | | | | | |
| CR$_5$ | | | | | | |
| | | | | | | |
| | | OVERALL BAND | 50 | 50 | | |
| | | REMAINING BAND | 45 | 20 | | |

FIG. 15(a)

SWITCHING NODE 2B (FROM 2B TO 2A)

| VPI | 4ba | | | | | 36ba |
|---|---|---|---|---|---|---|
| CRi | TEIj | VCIk' | Uc | Uv | CLASS | CALL STATE |
| CR$_1$ | TEIb | VCI$_{1'}$ | — | 20 | 3 | |
| CR$_2$ | TEId | VCI$_{2'}$ | — | 20 | 3 | 10:31:02 |
| CR$_3$ | TEIf | VCI$_{3'}$ | 5 | — | 1 | |
| CR$_4$ | | | | | | |
| CR$_5$ | | | | | | |
| | | | | | | |
| | | OVERALL BAND | 50 | 50 | | |
| | | REMAINING BAND | 45 | 10 | | |

FIG. 15(b)

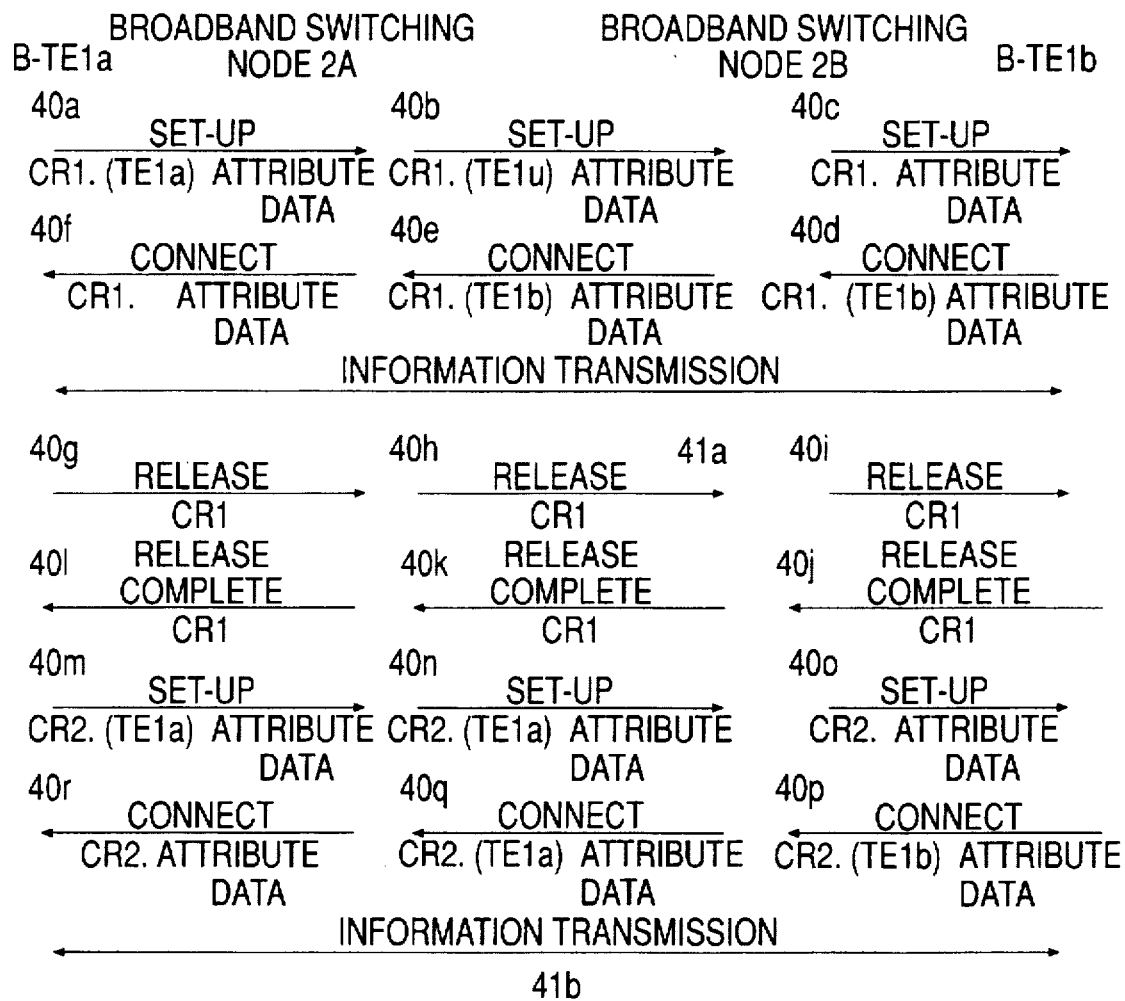
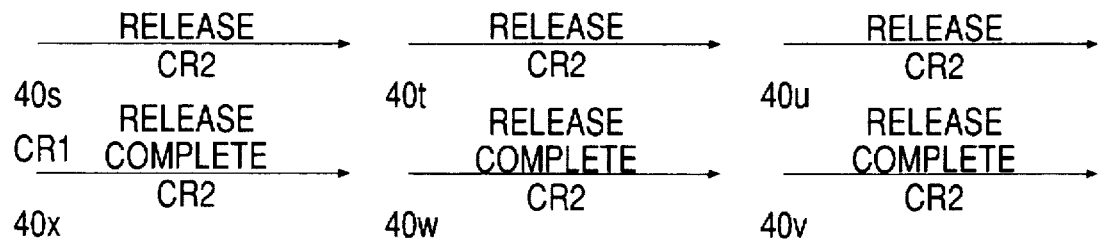
FIG. 16

DISCONNECTION

SWITCHING NODE 2A (FROM 2A TO 2B)

| VPI | 4ab | | | | | 37ab |
|---|---|---|---|---|---|---|
| TEIi | PARTY'S TEIj | VCIk | Uc | Uv | CLASS | CALL STATE |
| TEIa | TEIb | VCIi | — | 10 | 3 | |
| | | | | | | |
| | | | | | | |
| | | | | | | |
| | | | | | | |
| | | | | | | |
| | | OVERALL BAND | 50 | 50 | | |
| | | REMAINING BAND | 50 | 40 | | |

FIG. 17(a)

SWITCHING NODE 2B (FROM 2B TO 2A)

| VPI | 4ba | | | | | 37ba |
|---|---|---|---|---|---|---|
| TEIi | PARTY'S TEIj | VCIk' | Uc | Uv | CLASS | CALL STATE |
| TEIb | TEIa | VCIi' | — | 20 | 3 | |
| | | | | | | |
| | | | | | | |
| | | | | | | |
| | | | | | | |
| | | | | | | |
| | | OVERALL BAND | 50 | 50 | | |
| | | REMAINING BAND | 50 | 30 | | |

FIG. 17(b)

| CATEGORY | ITEM | CALCULATION EXPRESSION (UNITS OF Uc AND Uv:MBPS) | TRANSMISSION SPEED | | | | UNIT |
|---|---|---|---|---|---|---|---|
| | | | 64Kbps | 1Mbps | 10Mbps | 100Mbps | |
| CONSTANT BIT RATE TRANSMISSION | (1) THE NUMBER OF CELLS TO BE TRANSMITTED | $1.56 \times 10^5 \times Uc$ | $1.00 \times 10^4$ | $1.56 \times 10^5$ | $1.56 \times 10^6$ | $1.56 \times 10^7$ | CELLS/MIN |
| | (2) CELL UNIT FEE | $4 \times 10^{-4} \times Uc^{-1/3}$ | $1.00 \times 10^{-3}$ | $4.00 \times 10^{-4}$ | $1.86 \times 10^{-4}$ | $8.62 \times 10^{-5}$ | ¥/CELL |
| | (3) COMMUNICATION TIME UNIT FEE | $(1) \times (2) \; (\propto Uc^{2/3})$ | 10 | 62 | 290 | 1345 | ¥/MIN |
| VARIABLE BIT RATE TRANSMISSION | (4) MAXIMUM NUMBER OF CELLS TO BE TRANSMITTED | $1.56 \times 10^5 \times Uv$ | $1.00 \times 10^4$ | $1.56 \times 10^5$ | $1.56 \times 10^6$ | $1.56 \times 10^7$ | CELLS/MIN |
| | (2) CELL UNIT FEE | $10^{-4} \times Uv^{-1/3}$ | $2.50 \times 10^{-4}$ | $1.00 \times 10^{-4}$ | $4.65 \times 10^{-5}$ | $2.16 \times 10^{-5}$ | ¥/CELL |
| | (3) PATH HOLDING TIME UNIT FEE | $(4) \times (5) \times 0.4 \; (\propto Uc^{2/3})$ | 1 | 6 | 29 | 134 | ¥/MIN |

*FIG. 18*

| SERVICE TYPE | APPLICABLE CLASS | CONDITION | OVERALL TRANSMISSION SPEED | | | |
|---|---|---|---|---|---|---|
| | | | 64Kbps | 1Mbps | 10Mbps | 100Mbps |
| CBR SERVICE | CLASSES A AND D | Uc | ¥10 / MIN | ¥62 / MIN | ¥290 / MIN | ¥1345 / MIN |
| MER SERVICE (ASSUMING Uc=Uv) | CLASSES B AND D | Uc + Uv (η = 0.1) | ¥7 / MIN | ¥40 / MIN | ¥188 / MIN | ¥885 / MIN |
| | | Uc + Uv (η = 0.5) | ¥7 / MIN | ¥45 / MIN | ¥209 / MIN | ¥1037 / MIN |
| | | Uc + Uv (η = 1.0) | ¥8 / MIN | ¥51 / MIN | ¥236 / MIN | ¥1226 / MIN |
| VBR SERVICE | CLASSES C AND D | Uv.F = 1 MB | ¥7 EVERY 2 MIN | ¥8 EVERY 8 MIN | ¥30 EVERY 0.8 MIN | ¥135 EVERY 80 MIN |
| | | Uv.F = 10 MB | ¥73 EVERY 21 MIN | ¥27 EVERY 1.3 MIN | ¥39 EVERY 8 MIN | ¥139 EVERY 0.8 MIN |
| | | Uv.F = 100 MB | ¥729 EVERY 208 MIN | ¥286 EVERY 13 MIN | ¥126 EVERY 1.3 MIN | ¥179 EVERY 8 MIN |

FIG. 19

EXAMPLE OF TRAFFIC CHARACTERISTICS U.S. SERVICE QUALITY
WITH SHARED BUFFER SWITCH

| OFFERED LOAD | RANDOM TRAFFIC | BURST TRAFFIC |
|---|---|---|
| 85% | $\ll 10^{-10}$<br>22 CELLS | $\approx 10^{-2}$<br>2560 CELLS |
| 90% | $\ll 10^{-10}$<br>34 CELLS | $\approx 10^{-1}$<br>2560 CELLS |
| 95% | $\ll 10^{-10}$<br>68 CELLS | $> 10^{-1}$<br>2560 CELLS |

UPPER ROW : CELL LOSS RATE
LOWER ROW : 99.9% DELAY TIME

FIG. 21

CONNECTION DATA MANAGEMENT TABLE

| CALL IDENTIFIER | CALL TYPE | VCI | TIME STAMP |
|---|---|---|---|
| | | | |
| | | | |
| | | | |
| | | | |

*FIG. 23*

USED BANDWIDE AND NUMBER OF SET VC'S MANAGEMENT TABLE

|     | USE BANDWIDE | CALL TYPE 1 | | CALL TYPE 1 | | | CALL TYPE M | |
| --- | --- | --- | --- | --- | --- | --- | --- | --- |
| VP1 | $W_1$ | $n_{11}$ | $n'_{11}$ | $n_{12}$ | $n'_{12}$ | | $n_{1m}$ | $n'_{1m}$ |
| VP2 | $W_2$ | $n_{21}$ | $n'_{21}$ | $n_{22}$ | $n'_{22}$ | | $n_{2m}$ | $n'_{2m}$ |
| | | | | | | | | |
| VPn | $W_3$ | $n_{31}$ | $n'_{31}$ | $n_{32}$ | $n'_{32}$ | | $n_{3m}$ | $n'_{32}$ |

FIG. 24

VIRTUAL BAND DATA

| | $n_{ix}=0$ | 1 | | n |
| --- | --- | --- | --- | --- |
| CALL TYPE 1 | $\Delta W_{1,0}$ | $\Delta W_{1,1}$ | | $\Delta W_{1,n}$ |
| CALL TYPE 2 | $\Delta W_{2,0}$ | $\Delta W_{2,1}$ | | $\Delta W_{2,n}$ |
| CALL TYPE 3 | $\Delta W_{3,0}$ | $\Delta W_{3,1}$ | | $\Delta W_{3,n}$ |
| | | | | |
| CALL TYPE m | $\Delta W_{m,0}$ | $\Delta W_{m,1}$ | | $\Delta W_{m,n}$ |

FIG. 25

BROADBAND SWITCHING NETWORKS

This is a division of application Ser. No. 07/736,282, filed Jul. 25, 1991 now U.S. Pat. No. 5,825,766.

BACKGROUND OF THE INVENTION

1. Field of the Invention

The present invention relates to broadband switching networks using ATM (Asynchronous Transfer Mode) technics.

2. Description of the Related Art

Efforts for integrating individual service networks such as telephone networks, data networks, FAX networks, and so forth which have been developed and constructed over 100 years of history into one network system with ISDN (Integrated Services Digital Network) have been made throughout the world.

As the first step for constructing the ISDN system, narrow band ISDN systems have been operated in advanced countries including Japan since 1988. In addition, besides integration with a broadcasting network by using a broadband ISDN based on the ATM technics, the engineering developments of the ISDN network have been initiated by CCITT (International Telegraph and Telephone Consultative Committee) and promoted in major laboratories in the world.

The broadband ISDN network is provided with an ultra high speed user-network interface with a transmission speed of 155.52 Mbps or 622.08 Mbps. Thus, through the same interface, the conventional telephones, facsimile machines, and so forth can be treated as a constant speed service CBR (Continuous Bit Rate), while computer data with large capacity and ultra high speed including motion pictures, such as, high definition TV pictures, CAD (Computer Aided Design) data, and computer graphics data, and so forth can be treated as a variable speed service VBR (Variable Bit Rate). Thus, with the CBR and the VBR services, various data can be flexibly transmitted through the same interface.

However, thus far, before making a communication, the user had to declare call attribute data such as peak traffic, mean traffic, burstiness, terminal equipment type, service quality (for example, cell loss rate, cell transmission delay), and the like upon the network. In accordance with the call attribute data that the user has declared, the network estimates a required communication resource necessary for making the communication with respect to the call, checks the use state of the resource in the network, and determines whether or not to accept the call request. As the result of the determination, when the call request is accepted, the information to be transmitted is divided into packets which have a constant length (53 octets) (the packets are named cells) and then sent to the network. However, occasionally, cells which do not conform with the attribute data being declared may be sent to the network.

Thus, when unexpectedly excessive cells are sent to the network and they are concentrated in one path (as the burstiness is strong, this tendency becomes remarkable), they reside in the network. To prevent that, ATM switches, each of which is a constructional key element of the broadband ISDN network, are provided with a cell buffer with a large storage capacity. However, if such a cell buffer cannot store the cells which stay in the network, they will be lost. This situation is named a cell discard. When the network receives cells and then marks those which exceeds the range of attribute data declared by so-called polling function as violation cells, they are discarded. In addition, when a terminal equipment sends cells as non-priority cells in VBR such as class B (variable bit rate picture communication) (for example, in hierarchical picture coding system, a method where cells are divided into priority cells and non-priority cells depending on their importance is being considered), they are discarded. If the buffer does not fully store the cells even after the marked cells are discarded, cells in class A (circuit emulation communication) or the like will be also discarded.

Generally, a bit error due to noise or the like over the transmission path is checked with a CRC code disposed at the last position of information to be transmitted. When necessary, by issuing a retransmission request to the sender side, the information with respect to a bit error can be restored. However, when the cell discard is performed, since the receiver side cannot know the transmission of cells, it cannot request the retransmission of the cells to the sender side.

Since the cell discard will become a critical problem in data communication with respect to class C (connection oriented) and class D (support of transmission of connection-less data), a sequence number is provided for the information field of each cell (48 octets) as an ATM adaptation layer function. In addition, a mechanism for detecting the cell discard and for issuing a retransmission request on the receiver side is additionally provided.

On the other hand, for calls in the classes A and B, which should be transmitted in real time, CCITT has recommended a coding system which can withstand the cell discard.

Major problems with respect to the broadband ISDN switching networks which have been studied mainly by CCITT are summarized as follows.

(1) Service quality (a) Cell discard

As was described earlier, by assigning a sequence number, it is possible to detect a cell loss on the receiver side. However, since calls in the classes A and B should be transmitted in real time, it is substantially difficult to restore cells which are lost by the retransmission. By the coding method, which is a future study subject, it may be possible to reduce the adverse effect of the discard of non-priority cells. However, besides the discard of the normal cells (those which are neither violation cells nor non-priority cells), the discard of violation cells will result in critical problems.

In other words, when a honest (innocent) user unconsciously violates the range of the attribute data being declared, cells that the user has transmitted will be discarded regardless of whether they are priority cells or non-priority cells. In other words, the information received by the network may be lost. In addition, the sender side cannot know what and how much information is lost. To prevent that, a prudent and honest user will always have to declare the attribute data with an allowance although he or she knows that the communication fee will becomes expensive.

On the other hand, a user who wants to save the communication fee will declare the attribute data which is rather small while observing the traffic condition of the network although he or she knows that violation cells may take place. In other words, each user will haggle with the network about the negotiation of the attribute data like playing a game therewith. Whenever the user repeats success and failure in the negotiations with the network, his or her action will escalate.

The increase of such users causes the traffic in the network to be abnormally increased and thereby loosing ordinal cells transmitted by prudent and honest users. Thus, the users have suspicion and apprehension about the network. It is inevitable that the essential purpose of the public communication network, which is "correct, fast, and impartial communication transmission", is discarded.

Moreover, even in the classes C and D, the same situation will take place. Particularly, in data communication, as was described above, since the loss of information is never permitted, the retransmission of cells which were lost will be performed in a high rank layer.

As the traffic is heavy, probability of occurrence of a cell discard will become high. When the retransmission of cells which were lost is repeated, the traffic will become much higher. Thus, the network will become congested. In other words, the cell discard will result in deteriorating the stability of the network.

(b) Variation of cell delay

As was described above, in high traffic conditions, cells will reside in the network. In other words, the cells will be transmitted with a delay. As the capacity of the switch (the scale of ATM switch) becomes large and/or the number of relays in the network increases, the amount of delay increases. In addition, the amount of delay varies depending on the traffic condition in the network. This variation of the amount of delay is named the variation of cell delay. For calls in the classes A and B, which should be transmitted in real time, it is necessary to provide a buffer on the receiver terminal equipment side so as to compensate the variation of cell delay. For example, in a relatively small scaled broadband switching network accommodating about 100 lines (interface), the variation of cell delay is in the range from about several μ sec to about several msec. However, in an international communication, since there are many relaying networks, the variation of cell delay may be several 100 msec (excluding the absolute delay time involved in long distance transmission). Thus, each terminal equipment should be provided with a buffer with large capacity (several Mbytes for a terminal equipment with an information speed of 100 Mbps). To prevent that, it is necessary to decrease the variation of cell delay itself in the network in a manner to perform priority control in accordance with required service quality by using an ATM switch, which will be described later.

(c) Call connection time

The conventional switches including those for narrow band ISDN systems usually take several seconds, occasionally more than 10 seconds, or 20 seconds for connecting a call (until an originating user of a telephone hears a ring back tone).

When the originating terminal equipment issues a call set request to a switch node, it performs a terminating process for the call. Thereafter, the switch node obtains a line connected from the originating terminal equipment to the terminating terminal equipment and performs an originating process to the terminating terminal equipment.

However, when a call passes through a plurality of relay switch nodes, since each relay switch node individually performs the terminating process, line obtaining process, and originating process, the connection time becomes much longer.

On the other hand, the broadband ISDN network employs the conception of above mentioned logical bus so as to simplify the processes required in each relaying node. However, it is necessary bidirectionaly to negotiate with the network the attribute data which was negotiated upon the set of the call, to obtain a band in a virtual path in accordance with the negotiated result, and to perform an originating process to the terminating terminal equipment (from the originating terminal equipment to the terminating terminal equipment through the network; from the terminating terminal equipment to originating terminal equipment through the network). There is no denying the fact that the call which is connected from the originating terminal equipment to the terminating terminal equipment takes a time on the order of seconds.

However, for calls in the classes A and B, where it is estimated that their communication times are equal to or longer than those of telephones, the connection time on the order of seconds does not result in a remarkable problem.

However, in a computer communication where information is intermittently transmitted, if a call connection takes a time on the order of seconds whenever the information is transmitted, the performance of the computer cannot be satisfactorily used and thereby the operability of the system is degraded. To prevent that, in LAN (Local Area Network), which is a dedicated local area computer communication system, a system named a connection-less is used to allow the user not to realize a long connection time. When the broadband ISDN is practically used, it will be possible to transmit a file with a storage of 1 Mbytes in several msec. Thus, in a computer communication, where the performance is intensively advanced as technologies are rapidly innovated at the present time, it can be said that the utilization of the connection-less system will become mandatory.

On the other hand, the above mentioned class D for "support of transmission of connection-less data" supposes inter-LAN connections. In this class, when a call is initially connected, a connection time equivalent to those in the classes A and B is permitted. After the call is connected, the path is held for a long time. The routing control from end to end is handled by the user (upper layer) rather than the network.

In the LAN system, where the same communication medium is shared by a large number of users, a traffic always takes place over the LAN and between LANS. Thus, even if the path is held in the broadband ISDN network for a long time, it can be operated in commercial basis. However, when one computer terminal equipment is connected directly to the broadband ISDN network, for example in the case where a remote user accesses a central data base, if a path is held in the class D for a long time, it cannot be operated in commercial basis because information is intermittently transmitted as was described earlier. In addition, for example by providing the network with a permanent virtual path, where from the standpoint of the user it seems that a dedicated line is routed between both the ends and thereby a call connection is not required, and with a function for generating the address of a cell header by using the address of an upper header, which are subjects to be studied in future, a connection-less service can be accomplished. However, with the above permanent virtual path and the function, the network should hold a particular communication resource always or until the communication is completed so that it can handle the accessing of each user anytime. Thus, an expensive communication fee will be applied to each user. Most of users who make much account of cost performance along with performance should select the connection oriented data communication in the class C with consideration of connection item on the order of seconds. In other words, it is suggested that the ordinary users frequently issue call connection requests in the network and thereby it tends to be congested and loose the stability thereof.

It is estimated that half the full families will use advanced personal computer communication systems with hypermedia or the like in the year of around 2000. However, unless the broadband ISDN network effectively operates the communication resources at inexpensive cost and provides connection-less services with a light load thereof or reduces a call connection time to the same level as the connection-less services, it will not be able to attract the ordinary computer users which expectedly have huge latent demands (although LAN connection users are limited only to major companies and the like). In addition, with respect to the stability of the network, it is no exaggeration to say that such problems should be solved as soon as possible along with the necessity of stability of the network.

(2) Declaration of attribute data (a) Reliability of user declaration

As was described above, in the broadband ISDN, before starting the communication, each user should declare to the network complicated and difficult parameters such as peak traffic, mean traffic, burstiness, terminal equipment type, and service quality (QOS: cell discard rate, transmission delay time, and the like) as attribute data. The materialization of the attribute data is still being studied by CCITT at the present time.

It will be very difficult for the ordinary users to correctly understand the meaning of the attribute data and to correctly estimate and declare to the network each parameter value with respect to the call to be made. To prevent that, at the sacrifice of the flexibility, which is the greatest feature of the broadband ISDN, several service items which are combinations of the above mentioned attribute data will be provided so that the users can select them.

Although the network obtains a communication resource in accordance with declared data, each user can unidirectionally send cells to the network regardless of the declared data.

To allow the network, which tries to deliver received cells with the best effort, to stably and effectively operate, the correctness of the declared attribute data is preconditionally required.

Another problem for materializing the broadband ISDN is how to establish with flexibility suitable for various communication needs of the users the declaration method and operation method of attribute data which do not adversely affect the stability and the like of the network even if the declared data contains errors and false data.

(c) Charging method

Another subject to be solved in future is what charging method is set in the broadband ISDN network. At the present time, this subject is not being studied. However, depending on the charging method being set, it will remarkably affect the stable operation of the network and the design of the communication equipment such as switches. Thus, this subject should be solved as soon as possible.

Of course, the charging method to be set should be reflected with attribute data declared by each user. The charging method should be user friendly, false resisting, and inductive of proper use of communication resources in the network. Besides simplification of attribute data, establishment of method with general view is required.

(3) Construction/process of broadband switches (a) Buffer capacity of ATM switch As was described earlier, for the ATM switches, each of which is a key element for accomplishing the broadband ISDN, cell buffers with a large storage capacity are required. In addition, each switch should achieve a throughput of 155.52 Mbps or 622.08 Mbps. To break the engineering problems of the switch including the development of the construction method for improving the effectiveness thereof, they are being intensively studied and developed in many laboratories and the like. For each ATM switch employing the Bather-Banyan network method, the common buffer method, or the like, which are considered at the present time, even if it is small in scale such as 8×8, a buffer with large capacity for storing several hundred cells will be required as will be described later in more detail. The buffer with large capacity is mainly used when calls with large burstiness are gathered in a path in the same direction. Such a buffer remarkably disturbs the production of large capacity of the ATM switch LSIs along with the suppression of variation of cell delay. By reconsidering the method suitable for the broadband ISDN, if the storage capacity of the buffer were be remarkably reduced, the effect will unexpectedly become large.

(b) Priority control

As was described earlier, the ATM switch determines and controls which cells are output to a desired path with a high precedence in accordance with the service quality (such as cell discard rate and communication delay time) that each user has declared and or whether they are non-priority cells or violation cells. Such a control means prevents the ATM switch LSI from providing large capacity and from decreasing the cost thereof along with necessity of high speed cell buffer with large storage capacity.

(c) Policing function

As was described earlier, at the present time, each user can unilaterally send cells to the network even if the attribute data (or service item) is not what was declared to the network when he or she has set the call. A function for supervising the range of the attribute data (or service item) and for adding it with a violation cell mark if the cell violates the range of the attribute data (or service item) may be provided in each subscriber line interface, which is followed by the ATM switch, so as to further improve the supervisory function, to discard cells in accordance with the traffic condition in the network, and to prevent excessive cells from entering the ATM switch. Thus, the some improvements such as decrease of the storage capacity of the buffer may be expected for the ATM switch. However, only with such improvements, many problems and subject involved in the broadband ISDN network at the present time cannot be comprehensively solved unlike the present invention.

(d) Call acceptance control

A call acceptance control is used to estimate a communication resource necessary in the network in accordance with the attribute data declared by the user and to determine whether or not the resource is accepted. To satisfy a particular traffic intensity necessary for the switch, this control should be accurately and rapidly processed with a simple algorithm. This control method is being evaluated in related study associations.

(e) Charging/traffic totalization

As was described earlier, in the broadband ISDN which has been studied, the cell discard and preference control are performed in the switch. Thus, a difference takes place between information that each user transmitted and that which was transmitted to the receiver side through the network. In addition, the service quality varies for each call and depends on the traffic condition in the network. Thus, when the charging of cells is measured or the traffic in the network is measured for each destination, it is necessary to provide a calculating function in the network (followed by the ATM switch).

However, although a cell which flows in the network has information named a cell header (5 octets) for performing routing control, it contains a virtual path identifier (VPI), a virtual channel identifier (VCI), and the like, which identify the receiver, rather than information for identifying the sender. Thus, it is difficult practically to accomplish the above mentioned object. In other words, in the available method, the number of cells which are sent at the entrance of the network is measured without a provision for checking whether the cells are really sent to the destinations. Thus, the users will not satisfy the network system at the present time.
(4) User-network interface (UNI)

Thus, far, CCITT has intensively studied the fundamental framework of the broadband ISDN. However, the evaluation of the practical user-network interface is a subject to be studied in future. In evaluating the interface, the method where interface is shared by a plurality of terminal equipments, so-called multi-point multi-drop connections, accomplished in narrow band ISDN, will become important, since the interface provides an ultra high speed transmission. In addition, the interface will require compatibility with a transmission speed of 64 kbps, which is the basic speed of the narrow band ISDN so that the broadband ISDN and the narrow band ISDN are mutually connected.

SUMMARY OF THE INVENTION

Therefore, an object of the present invention is to provide broadband switching networks for totally solving problems and subjects involved in the above mentioned ISDN public networks, in particular, user-network interface, which is a subject to be solved, without deviation from fundamental framework which has been studied by CCITT thus far.

To accomplish the above object, a broadband switching network according to the present invention has a plurality of broadband switch nodes and a broadband switch inter-node transmission line for connecting the plurality of broadband switch nodes, information being transmitted by cells, each of which comprises a header and an information field, wherein the broadband switch node comprises a broadband input and output port for inputting and outputting the cells to and from the broadband inter-node transmission line, and switch means for separating the cells being input through the broadband input and output port and for multiplexing the cells so as to output them, wherein data composed of the plurality of cells is transmitted and received through the broadband switch node by constant bit rate transmission, variable bit rate transmission, or a combination of the constant bit rate transmission and the variable bit rate transmission.

Thus, in the broadband switching networks according to the present invention, with flow control performed cooperatively by the network and terminal equipments, excessive cells do not enter the network and thereby prevent cell discard from taking place in the network.

In addition, by randomizing arrival intervals of cells which enter the network (or an ATM switch), the burstiness of cells disappears and thereby remarkably reduces the storage capacity of the buffer of the ATM switch. In addition, the variation of cell delay can be remarkably reduced.

In addition, since no cell discard basically takes place, it is always not necessary to assign for each cell a cell sequence number in information field by the ATM adaptation layer unlike the related art. Thus, the transmission speed of user information can be increased so as to effectively use the resources in the network.

Moreover, by providing a transmission service in constant bit rate transmission, a transmission service in variable bit rate transmission for effectively using statistical multiplex effect characterized by the ATM, and a transmission service which is a combination of both the services suitable for transmitting pictures and the like, the user only needs to declare a transmission speed thereof instead of a combination of complicated attribute parameters unlike the related art. Thus, since it is not necessary to cause the network to unilaterally restrict service items, the flexibility, which is the most important aspect of the broadband ISDN network, is not lost and the network can be widely used for various user needs in the future.

Furthermore, the present invention also proposes a practical system for accomplishing the flow control and the randomization of cell arrival with respect to a multi-point connection service, which is a subject to be defined by CCITT in future. Thus, according to the present invention, with the same communication medium, communication with high efficiency can be provided.

In addition, for calls which have been interrupted or disconnected, the related communication resources are registered on management tables so as to quickly handle repeated call set request. In accordance with the traffic condition and other call requests, the communication resources are erased and released from the management tables. Thus, according to the present invention, services with the same quality as connection-less services can be provided. Besides inter-LAN connections in the class D, which are mostly used by large companies, the present invention provides remarkable benefits to communications using personal computers and the like. Thus, the communication resources in the network can be effectively used.

Moreover, since the present invention provides practical calculating methods for cell unit fees for transmission speeds, communication time unit fees, path holding time unit fees in accordance with service systems, it promotes the users to use proper communication resources in the network, while preventing other users from being adversely affected by false declaration. In addition, according to the present invention, the network can be effectively operated.

Furthermore, according to the present invention, neither polling function nor priority control is required in the network unlike the related art. Thus, the call acceptance control is simplified. Further, switch nodes or cross-connect nodes constructing the broadband ISDN networks or broadband industrial information communication networks will be readily developed.

BRIEF DESCRIPTION OF DRAWINGS

FIG. 4 shows diagrams representing examples of attribute data declared by B-TE upon setting a call;

FIG. 15 is tables representing examples of management tables in an ATM switch node in the case where an interrupt message is used;

FIG. 16 is a schematic showing a sequence in the case where a disconnection message and a release message are used;

FIG. 17 shows management tables used in the sequence shown in FIG. 16;

FIG. 18 is a table representing fees by transmission rates for constant bit rate transmission and variable bit rate transmission;

FIG. 19 is a table representing practical communication fees for CBR service, MBR service, and VBR service.

FIG. 21 is a table showing cell discard ratios (upper row) and 99.9% delay time periods (lower row) for several load conditions in the cases of random traffic and burst traffic with average burst length of 10 in 64×64 switch (buffer length: 2560) of shared buffer type;

FIG. 23 is a connection information management table;

FIG. 24 is a table for managing bands for use and number of VCs being set;

FIG. 25 is a table showing virtual band data; and

DESCRIPTION OF PREFERRED EMBODIMENTS

Now, with reference to the accompanying drawings, an embodiment according to the present invention will be described.

Figure 1:
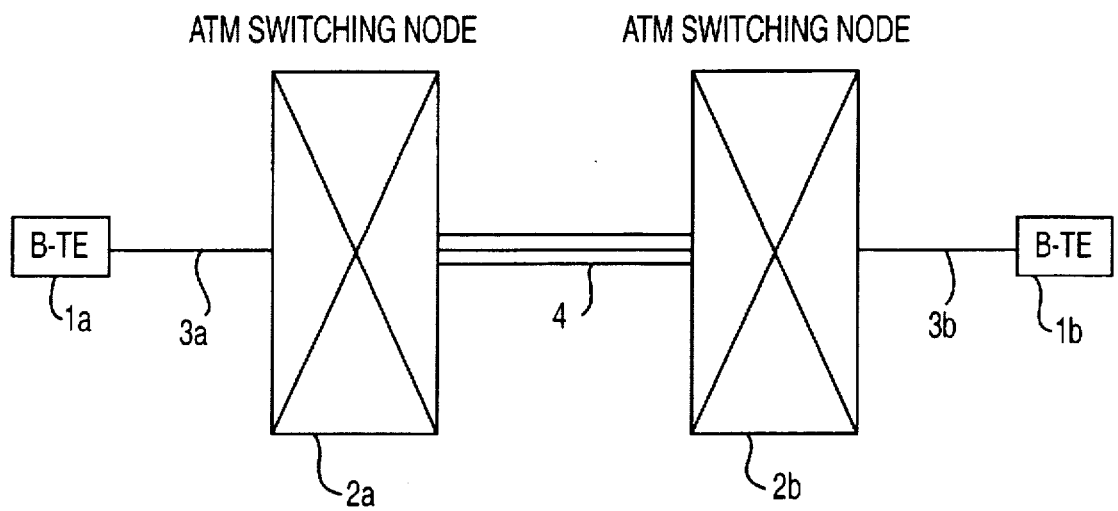
FIG. 1 is a block diagram showing an outlined construction of a broadband switching network of an embodiment according to the present invention.

FIG. 1 is a block diagram showing an outlined construction of a broadband switching network of an embodiment according to the present invention.

A broadband ISDN terminal equipment (hereinafter named a B-TE) 1a is connected through a subscriber line interface 3a to two ATM switch nodes 2a and 2b which construct a broadband ISDN network. In addition, the ATM switch node 2b is connected to a B-TE 1b on the receiver side through a subscriber line interface 3b. Moreover, between the two ATM switch nodes 2a and 2b, a virtual path 4 is disposed. Although in the figure, only the two ATM switch nodes are shown, a plurality of relay (cross connect) nodes may be disposed between the nodes 2a and 2b. In other words, an aspect of the broadband ISDN networks is such that a virtual path is routed between two ATM switch nodes, which terminate B-TEs. Besides the B-TEs 1a and 1b shown in the figure, the virtual path may be shared by other B-TEs terminated by the same switch nodes, as will be described later in more detail. In the broadband ISDN network, the address of an ATM cell, which is transmitted from a B-TE, is identified with a virtual channel identifier (VCI) and a virtual path identifier (VPI), which are provided at the beginning of the ATM cell.

The virtual channel identifier (VCI) is used to identify a B-TE or a subscriber line interface, which is directly connected to an ATM switch node. On the other hand, the virtual path identifier (VPI) is used to identify a virtual path in the broadband ISDN network.

In the figure, so-called network termination units (which are termed NT1 and NT2 by CCITT) are not shown so as to simplify the description.

Figure 2:
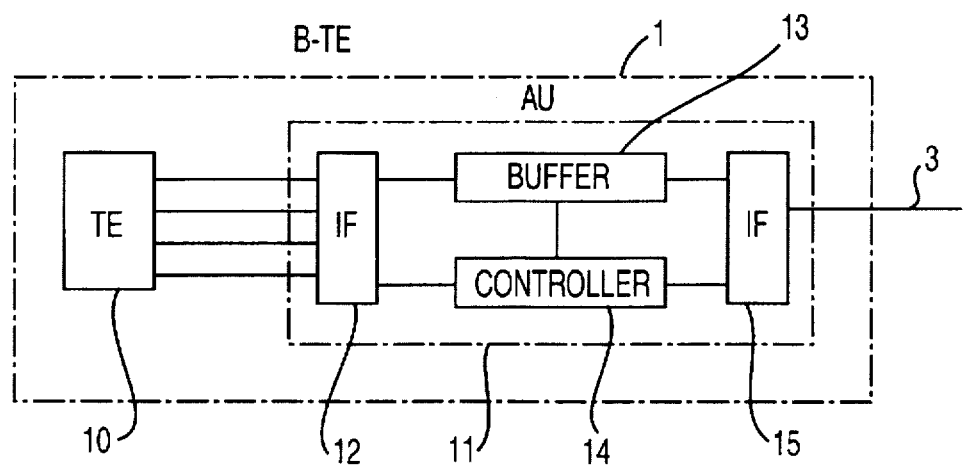
FIG. 2 is a block diagram showing an outlined construction of B-TE 1 shown in FIG. 1.

FIG. 2 is a block diagram showing an outlined construction of the B-TE 1 shown in FIG. 1. A terminal equipment such as a computer (hereinafter named a TE) shown in FIG. 1 is connected to a subscriber line interface 3 through an access unit (hereinafter named an AU) 11. The AU 11 is composed of connection interface circuits 12 and 15 for connecting the TE 10 and the subscriber line interface 3; a buffer memory 13 for transmitting and receiving ATM cells; and a controller 14 for controlling transmission and reception of the ATM cells.

The AU 11 can be connected with a plurality of TEs. A practical subscriber line interface where a plurality of TEs are connected to the AU 11 will be described later in more detail with reference to FIG. 11.

Figure 3:
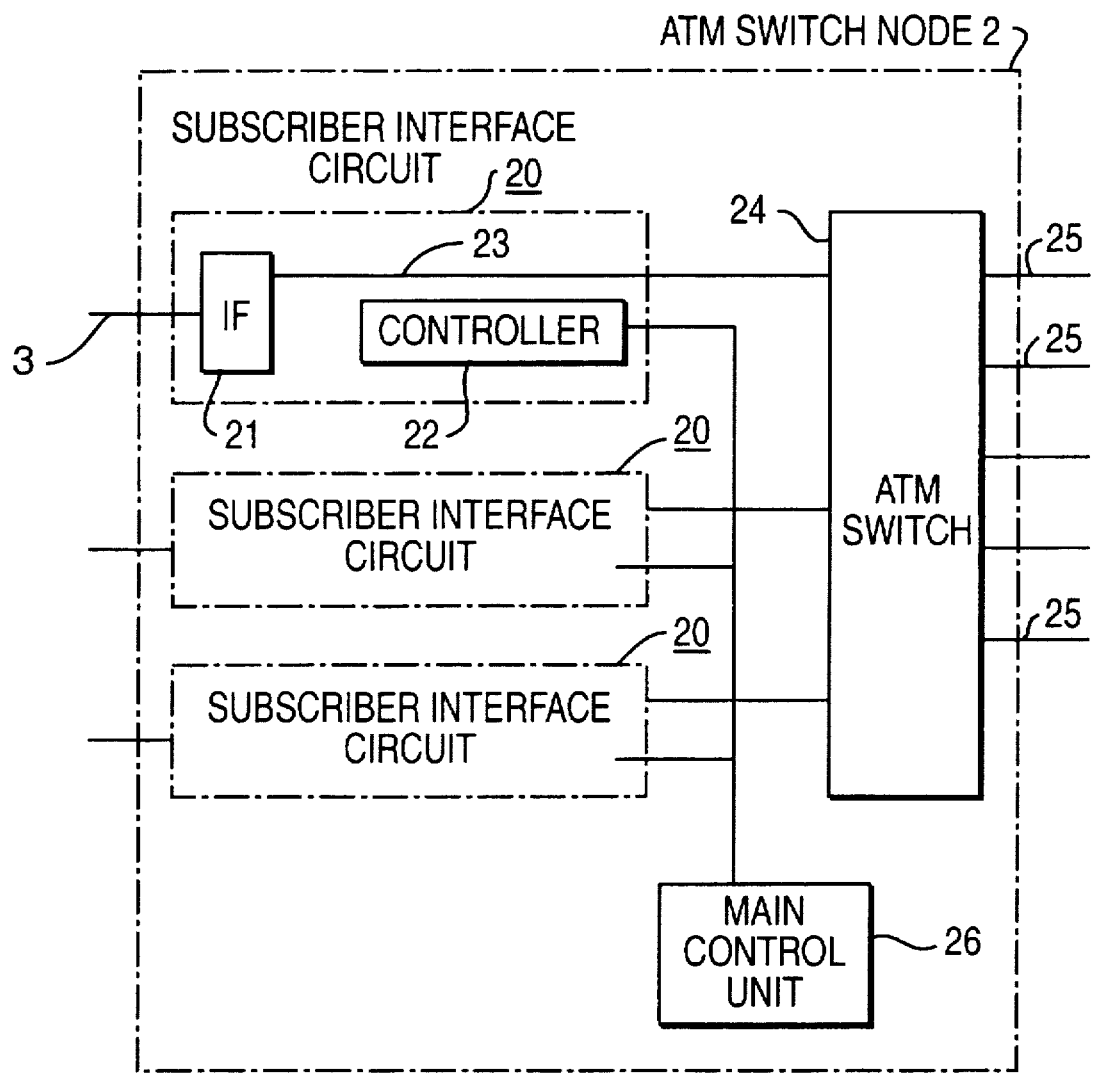
FIG. 3 is a block diagram showing an outlined construction of an ATM switch node 2 focusing on a subscriber line interface.

FIG. 3 is a block diagram showing an outlined construction of an ATM switch node 2 focusing on the subscriber line interface circuit.

As shown in the figure, the ATM switch 24 is provided with a plurality of input and output ports. A plurality of subscriber line interface circuits 20 and a plurality of inter-node transmission lines 25 are connected through the input and output ports.

The subscriber line interface circuit 20 is composed of a connection interface circuit 21 for transmitting and receiving ATM cells to and from a B-TE through the subscriber line interface 3; a controller 22 for controlling the transmission and reception of the ATM cells; and so forth. A memory equivalent to the buffer memory disposed in the above mentioned AU is not always required between the connection interface circuit 21 and the ATM switch 24. In addition, a plurality of above mentioned virtual paths 4 may be disposed over the inter-node transmission path 25. Moreover, the controller 22 and the ATM switch 24 are connected to a main control unit 26 for controlling all of the ATM switch node 2.

In this construction, the conventional polling function in the subscriber line interface circuit, the ATM cell priority control in the ATM switch, and so forth, which were used in the related art are not necessary (as will be described later in more detail).

FIG. 4 shows diagrams representing examples of attribute data declared from a B-TE when a call is set.

In a pseudo line communication of class A where the traffic intensity is constant as shown in FIG. 4 (a), as a constant bit rate (CBR) service, an information transmission speed Uc with a constant bit rate of 64 kbps, 10 Mbps, or the like, which is used for a 48 octet information field in an ATM cell or a user information transmission area other than an ATM adaptation layer used for cell discard and so forth, is declared. This transmission area is named SAR-PDU: Segmentation And Reassembly—Protocol Data Unit and has an area of 47 octets in the class A).

Although the length of the SAR-PDU area depends on each class, as will be described later, according to the present invention, since the cell discard rate can be decreased in such that it can be practically ignored, it will be possible to omit all or part of the ATM adaptation layer. Thus, unless otherwise noted, an information transmission speed with respect to the above mentioned information field will be used in the following description.

In a variable bit rate picture communication of class B where traffic always takes place and the traffic intensity always varies as shown in FIG. 4 (b), as an MBR (mixed bit rate) service which is a combination of a CBR service and a variable bit rate VBR service, an information transmission speed Uc with a constant bit rate and an information transmission speed Uv with a variable bit rate are declared.

As the information transmission speed with variable bit rate, it is possible to consider for example a peak speed, a mean speed, or a mean speed at which cells (information) are transmitted. However, for simplifying the description, the peak speed will be used in the following.

In a connection oriented data communication of class C, where the traffic intermittently takes place as shown in FIG. 4 (c), as a VBR service, an information transmission speed Uv with a variable bit rate is declared.

In a support of connection-less data communication of class D, where LANs are connected as shown in FIG. 4 (d), by considering the traffic which takes place between the LANs and a charging system which will be described later, the user selects one of the VBR service (when the traffic intensity is small and it intermittently takes place), the MBR service (when the traffic intensity varies in a large level and takes place almost anytime), and the CBR service (when the traffic takes place almost in a constant level). In accordance with the selection being made, the user declares one of Uv, Uc+Uv, and Uc.

The relationship between the service categories which have been studied by CCITT thus far and the MBR service is as follows. It is possible to understand that the sub category, which is the connection type service, is composed of only the CBR service part of the present embodiment; and each of the sub categories B, C, X, and connection-less type service is composed of both or either the CBR service part or the VBR service part.

With respect to the conventional attribute data, it was necessary to declare the peak traffic (speed), mean traffic (speed), burstiness, terminal equipment type, service quality (such as cell discard rate and communication delay time), and so forth. On the other hand, according to the present invention, it is possible to declare only Uc or Uv and if necessary terminal equipment type.

Even if the attribute data is remarkably simplified in such a manner, it does not affect the stable operation of the broadband ISDN network and user communications at all. Rather, according to the present invention, the attribute data helps to provide higher quality services than those of the conventional services.

Next, practical means for providing the high quality services will be described.

Figure 5:
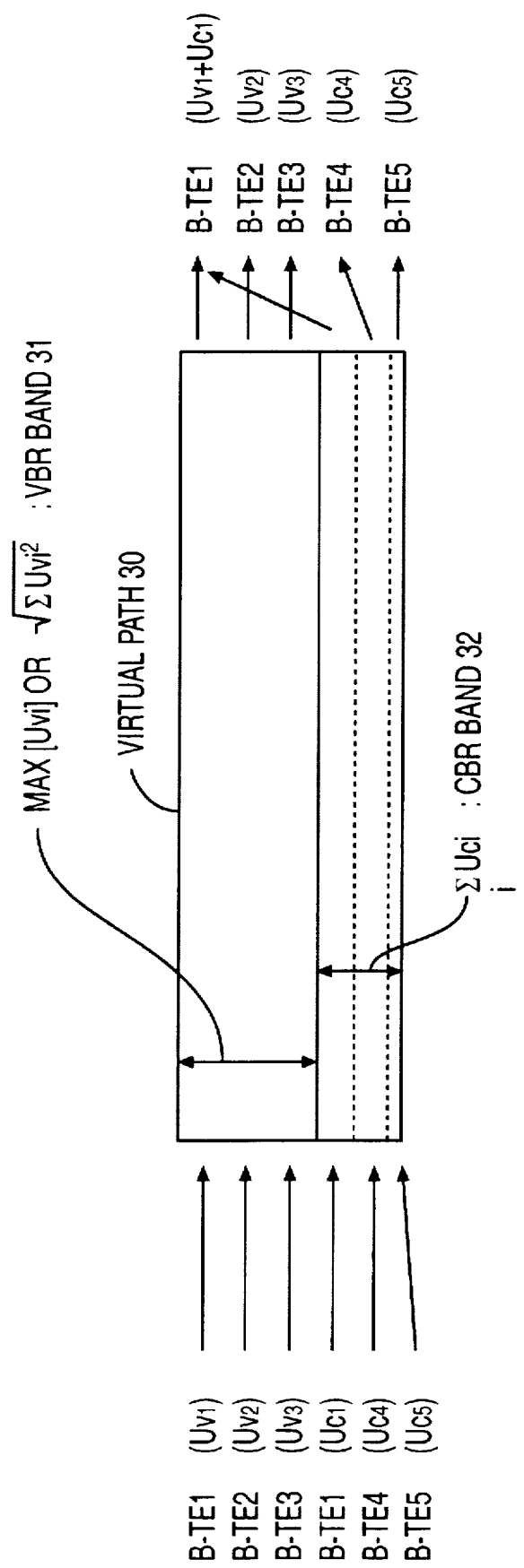
FIG. 5 is a schematic showing an example of registration of calls from a plurality of B-TEs in a virtual path being set between terminating ATM switch nodes.

FIG. 5 is a schematic showing an example where calls from a plurality of B-TEs have been registered in a virtual path 30 which is disposed between two terminating ATM switch nodes.

A B-TE 1 registers transmission speeds Uc1 and Uv1. Each of a B-TE 2 and a B-TE 3 registers transmission speeds Uv2 and Uv3. Each of a B-TE 4 and a B-TE 5 registers and transmission speeds Uc4 and Uc5. Thus, a virtual path 30 has a particular VBR band 31 for accommodating the transmission speeds Uv1 to Uv3 and a CBR band 32 which is the sum of the transmission speeds Uc1 to Uc5. By applying a statistical multiplex effect, which is one of features of the ATM system, the VBR band helps to effectively use the resources of the network. For example, to set a particular VBR band, the root of the sum of squares of Uv1 to Uv3 is obtained or the maximum transmission speeds of Uv1 to Uv3 and the traffic of the virtual path are measured for a particular time period. Thereafter, the VBR band is set so that the cell rate of ATM cells whose transmission is controlled to 5% or less.

In the example shown in FIG. 5, the band of the virtual path 30 is the sum of the VBR band 31 and the CBR band 32. However, it is possible to set a virtual path with a wider band than that shown in FIG. 5. In this case, in the range of the band, new calls can be accepted. When a new call exceeds the band or when the system is precisely operated so that the virtual path does not have an excessive band, it is possible to vary the band of the virtual path in accordance with the traffic condition.

Moreover, in the example shown in FIG. 5, the VBR band 31 is provided in common with the classes B to D. However, it is possible to set the band in accordance with the characteristics of each class, namely, the calculation result of the root of the sum of squares (when the mean traffic intensity, namely use rate, of transmission with variable bit rate is high like in the classes B and D), the measurement result of the maximum transmission speed (when the mean traffic is low like in the class C), or the measurement result of the real traffic over the virtual path (when the traffic intensity cannot be expected).

When the maximum transmission speed is set to the VBR band, calls declared with transmission speeds slower than the maximum transmission speed can be unlimitedly accepted.

For example, the number of ATM cells (traffic intensity), which enter the network, is always measured by the subscriber line interface circuit. When the mean traffic intensity in the VBR band becomes a particular level (for example, the mean use rate is 0.8), the network can widen the band when necessary or request a B-TE which is transmitting cells thereto to decrease the transmission speed. Alternatively, the network can restrict the acceptance of new calls.

Figure 6:
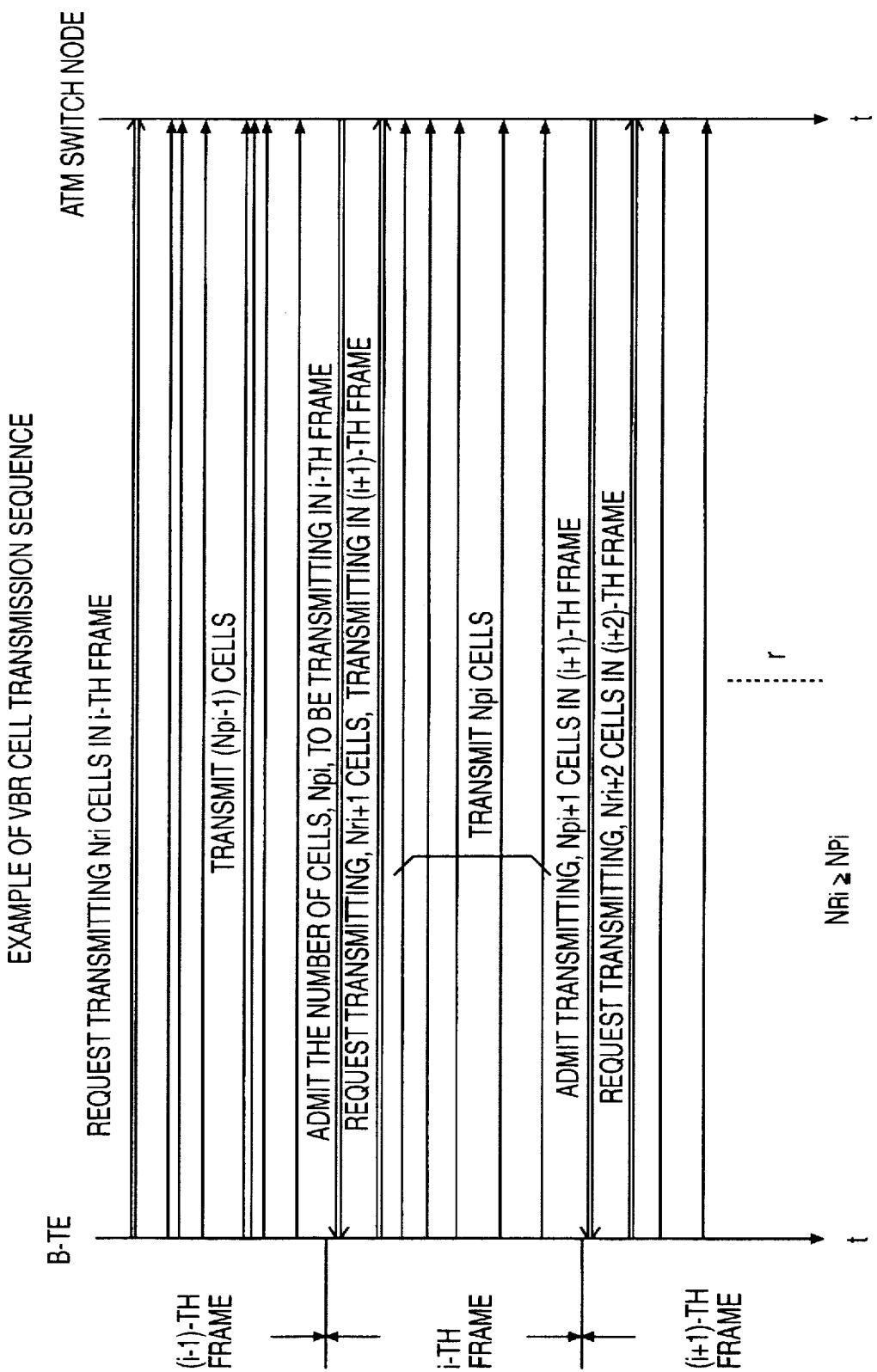
FIG. 6 is a schematic showing an example of an ATM cell transmitting sequence in a variable bit rate transmission.

FIG. 6 is a schematic showing an example of an ATM cell transmission sequence in a variable bit rate transmission.

When the physical speed of the subscriber line interface is assumed to be 155.52 Mbps, which has been defined by CCITT, the B-TE requests the ATM switch node to transmit the number of cells in the next i-th frame, each frame having for example an interval of 5.875 msec. The ATM switch node measures the number of cells from calls which pass through the same virtual path. When the total value of the number of cells requested is equal to or less than that which can be transmitted for each frame in the VBR band (for example, when the VBR band has a transmission speed of 10 Mbps, 10 Mbps/(48 octets×8 bits)×5.875 msec=153 cells), the ATM switch node permits the B-TE to transmit the number of cells requested. On the other hand, when the number of cells requested exceeds that which can be transmitted, the ATM switch node assigns to each B-TE the number of cells divided in proportion to the transmission speed registered when the call is set and then notifies each B-TE of the result as Npi so as to control the number of cells transmitted. When each B-TE is assigned Npi cells, it transmits to the network the number of cells so that it does not exceed Npi. Thereafter, the same sequence is repeated for each frame until all the call is completed.

In the above description, each B-TE requests the ATM switch node to permit the number of cells to be transmitted in the next frame. With tradeoffs of slight decrease of charging accuracy and resource use efficiency, the network can assign the number of cells to be transmitted in the next frame in accordance with the number of cells transmitted in the preceding frames and then notify each B-TE of the result. In other words, without the necessity of requesting the number of cells to each B-TE, the transmission of cells can be controlled so as to prevent excessive cells from entering the network.

Anyway, by processing the transmission of cells from each user to the network at each frame interval, the above mentioned cell transmission control can be performed along with a randomization process of cell transmission timing, which will be described later. In addition, with the number of cells in each frame, the parameter data to be declared to the network can be simplified. Moreover, when the number of cells permitted by the network is less than that requested by each terminal equipment, each terminal equipment can delay the transmission of cells or discard it. Thus, according to the present invention, the transmission quality can be improved in comparison with that of the related art. These features will be described in the following in more detail.

Figure 7A:
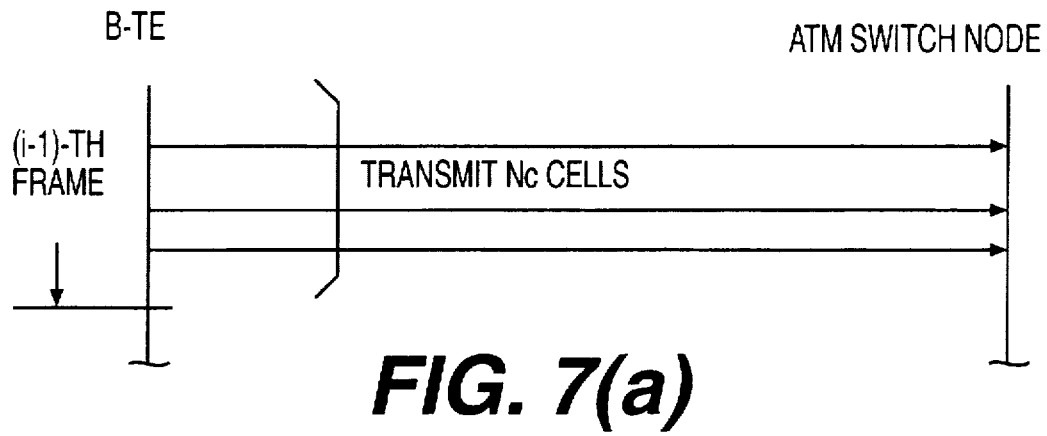
FIG. 7 is a schematic showing an example of cell transmission sequence in a constant bit rate transmission.
Figure 7B:
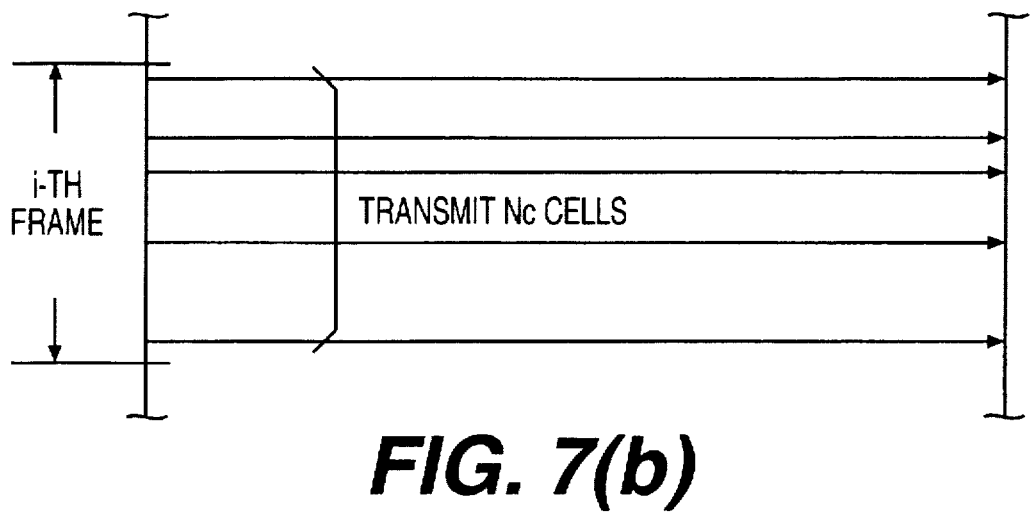
Figure 7C:
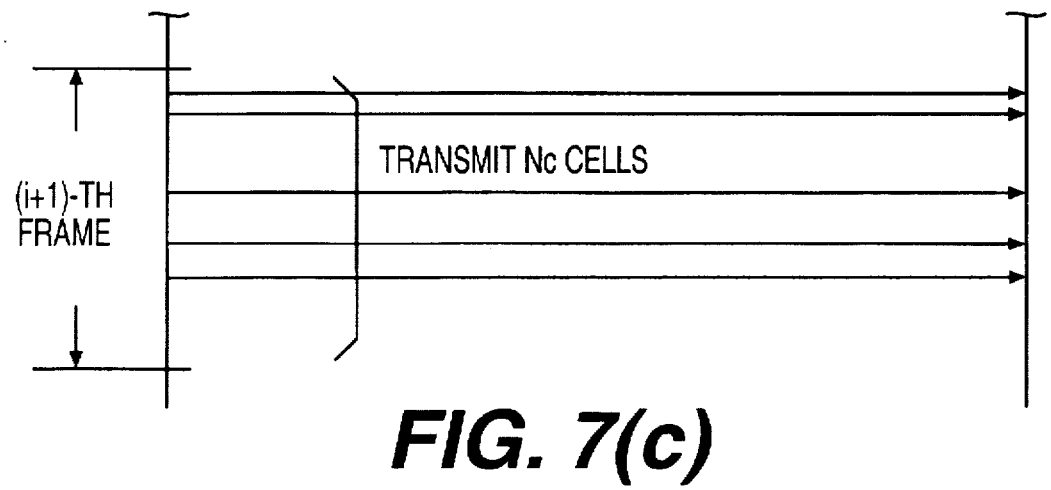

FIG. 7 is a schematic showing an example of a cell transmission sequence in the constant bit rate transmission.

As shown in the figure, in the constant bit rate transmission, the transmission rate is constant. Thus, the number of cells, Nc, transmitted in each frame is also constant. However, in this state, as a precondition each user does not set a transmission speed which exceeds that being registered. In addition, as will be described later, some dishonest users may transmit to the network cells which exceed registered transmission speeds. To prevent that, by notifying each user of the number of cells which can be transmitted in each frame (in the constant bit rate transmission, it is not always necessary to cause each user to request the network to permit the number of cells to be transmitted in each frame), the transmission of cells can be substantially controlled.

In the above example, the frame interval is set to 5.875 msec, which is 47 times longer than the basic frame interval of 125 µ sec in the narrow band ISDN network. Thus, since the frame interval of SAR-PDU in the class A is 47 octets, when one cell is transmitted at a frame interval of 5.875 msec, the transmission speed of the user information becomes 64 kbps. Thus, the compatibility with the narrow band ISDN network can be obtained and the mutual connection therewith can be readily accomplished. However, the frame interval according to the present invention is not limited to that described in the above mentioned example. Rather, it should be noted that the present invention can be applied in other frame intervals.

In addition, when the transmission speed is 64 kbps or less, the number of cells which can be transmitted in each frame becomes less than 1 cell. Thus, it is possible for the ATM switch node to notify each B-TE of the number of cells to be transmitted in a plurality of frames so as to control the transmission of cells. Alternatively, it is possible for the network to do those so that a mean bit rate for a long time meets the transmission speed being registered without setting a particular frame interval.

Moreover, in the above mentioned example, when the number of cells being requested exceeds that which can be transmitted, the number of cells divided in proportion to the transmission speed registered when the call was set can be assigned to each B-TE. However, it is also possible to assign the number of cells in proportion to the transmission speed to each B-TE. In other words, when Uv1 is 10 Mbps and Uv2 is 1 Mbps, respectively, the number of cells can be divided in the ratio of 10 to 1. In addition, the number of cells may be divided in accordance with a charging system, which will be described later. In other words, when the unit link fees for 10 Mbps and for 1 Mbps are Ψ 29 per min and Ψ 6 per min, respectively, the number of cells can be divided in the ratio of 29 to 6. Moreover, the number of cells can be divided in accordance with the square root of the transmission speed. Furthermore, various other methods can be considered.

If the B-TE requests the ATM switch node to permit the number of cells which exceeds the transmission speed registered when the call was set, even if the virtual path has enough capacity, the number of cells to be transmitted can be controlled regardless of the CBR service, the VBR service, or the MBR service so that the transmission speed becomes a speed equal to or less than the registered speed. Thus, the network can prevent dishonest users from performing false declarations.

Thereafter, since each B-TE transmits ATM cells in accordance with a command from the ATM switch node, excessive cells which exceed the transmission capacity of the network do not enter the network. When the ATM switch is provided with a cell buffer having a proper storage capacity, the network can stably operate without necessity of the cell discard and that of the polling function which was required in the related art.

When the number of cells which is not permitted by the broadband switch node enters the network or when it is performed in a timing not permitted thereby due to a failure of a terminal equipment or the like, by additionally providing over the interface simple hardware, such as a gate which is open and closed in accordance with a bit map of which the network has informed the terminal equipment, it is possible to prevent excessive cells from entering the network.

On the other hand, in the classes B to D, the network controls the transmission of cells from each B-TE. Thus, each B-TE cannot always transmit required information. In the class B, where ATM cells should be transmitted in real time, the B-TE cannot transmit in the next frames the ATM cells which cannot be transmitted. Thus, in this class, the cells which cannot be transmitted are discarded in the B-TE. However, in the variable bit rate picture communication using the above mentioned hierarchical picture code system, each B-TE can identify which ATM cells have higher precedences. Thus, in the case where Uc is declared for transmitting ATM cells with high precedence which remarkably affect the quality of pictures and Uv is declared for transmitting ATM cells with low precedence, when the transmission of cells is controlled by the network, namely, Npi is lower than Nri, each B-TE can discard ATM cells from those with lower precedence. Thus, the degradation of the picture quality can be minimized.

On the other hand, in the classes C and D, where data communication is handled, normally the real time property is not required. Thus, ATM cells which could not be transmitted can be transmitted in the next frames. This operation is equivalent to the flow control which has been often used in computer communications.

As was described above, the difference between the constant bit rate transmission CBR and the variable bit rate transmission VBR is that the cell transmission of the former may be controlled by the network, while that of the latter is not controlled by the network. Thus, in the constant bit rate transmission CBR, the transmission at a constant speed is always assured. In addition, by applying a randomization of cell arrival intervals, which will be described later, the time period of which ATM cells stay in the network can be remarkably reduced. Although ATM cells enter the network and then they are equally processed without being discarded and priority-controlled regardless of the constant bit rate transmission CBR or the variable bit rate transmission VBR, the network can stably and effectively operate. Thus, the processes of the ATM switch and the like are simplified.

In contrast, when cells in the constant bit rate transmission which are processed in the network in a different manner from that in the variable bit rate transmission are transmitted with a high precedence, the cell transmission order is inverted in the MBR service consisting of the constant bit rate transmission and the variable bit rate transmission. Thus, the processes conducted on the receiver side will become complicated.

As was described above, in the classes B to D, since the network controls the transmission of cells, excessive cells do not enter the network. Thus, the storage capacity of a buffer can be correspondingly decreased. On the other hand, when the arrival intervals of ATM cells which enter the network or the ATM switch are at random, namely, when the burstiness (a group of ATM cells which are simultaneously generated) is low, the probability of concentration of ATM cells over the same out line (virtual path) becomes low. Thus, the buffer capacity in the ATM switch can be further reduced. In addition, the network staying (delay) time of cells due to the buffering is also decreased. Thus, the network can equally process cells regardless of the cell types.

With the network equalization process for cells, the CLP bit becomes unnecessary. However, for example, by indicating a VBR cell with this bit, the interwork between the B-ISDN network and the N-ISDN network will be improved.

Figure 8A:
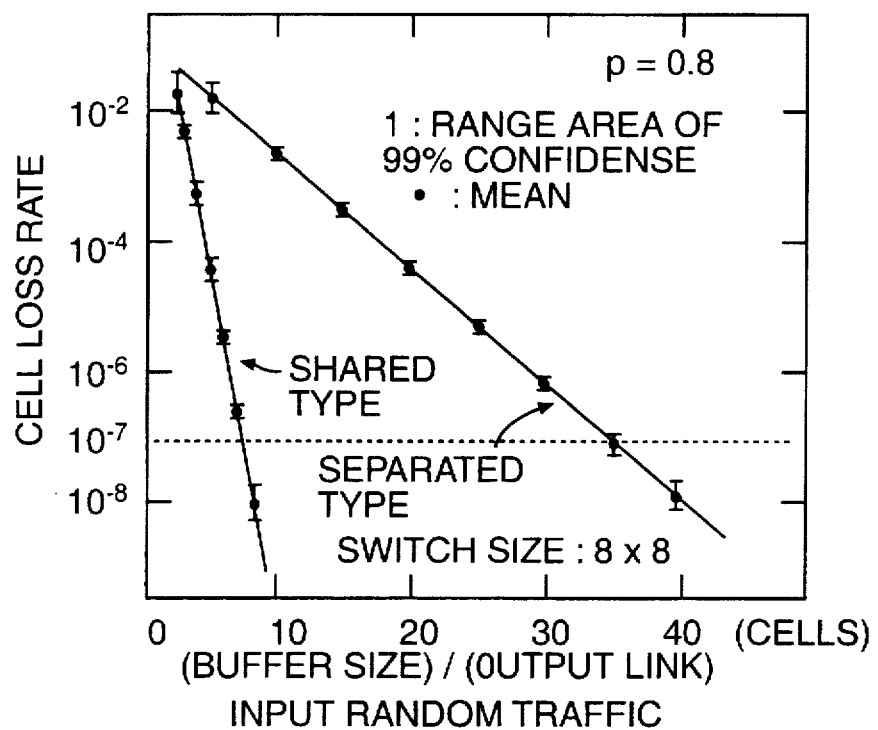
FIG. 8 shows diagrams representing the relationship between cell discard rate and buffer capacity with respect to traffic with strong randomness and with respect to traffic with strong burstiness for separated buffer type ATM switch and shared buffer type ATM switch being prototypically made.
Figure 8B:
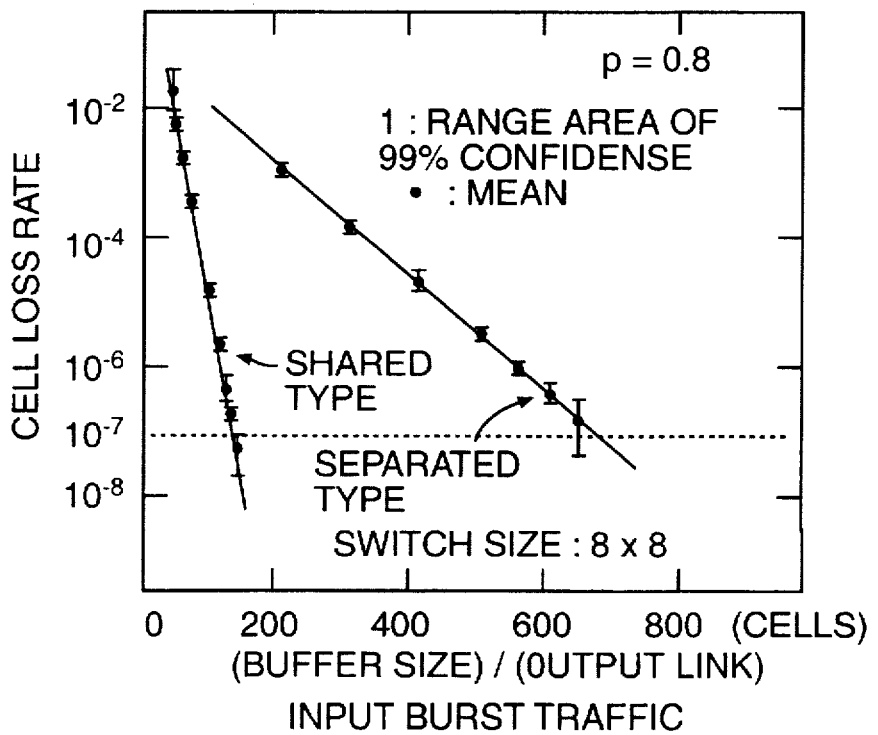

FIG. 8 shows diagrams representing the relationship between cell discard rate and buffer capacity for traffic with strong random property [FIG. 8 (a)] and for traffic with strong burstiness [FIG. 8 (b)] with respect to a separated buffer type ATM switch and a shared buffer type ATM switch which were prototypically made (reference: Endoh et al. "ATM Exchange Memory Switch with Shared Buffer", Journal, The Institute of Electronic, Information, and Communication Engineers of Japan, B-1, Vol. J72-B-1, No. 11, pp. 1062–1069, November 1989").

According to the result of the above mentioned experiment, even if the buffer storage capacity of the random arrival is decreased into 1/16th to 1/18th that in the burst arrival, the same cell discard rate can be accomplished. In addition, the cell delay time in the random arrival is decreased to 1/16th to 1/18th that in the burst arrival. As shown in the figure, since the cell discard rate is exponentially decreased in accordance with the storage capacity of the buffer, when the buffer has a capacity which is slightly larger than what is required (which is much smaller than that required in the related art), the cell discard rate can be decreased so that it is practically ignored.

The cell discard rates and the delay time periods of an ATM switch with cell transmission timing being randomized were simulated. By using such results, the possibility of the network equalization process will be described in the following.

FIG. 21 is a table showing cell discard ratios (upper row) and 99.9% delay time periods (lower row) for several load conditions in the cases of random traffic and burst traffic with average burst length of 10 in 64×64 switch (buffer length : 2560) of shared buffer type.

In the case of the burst traffic input, even if the load being applied is 85%, the cell discard rate is approximately 10–2, which is a very bad value. In addition, the delay time period becomes close to the buffer length. Thus, to obtain the reasonable throughput, it is obvious to use the priority control. On the other hand, in the case of the random traffic input, even if the high load of 95% is applied, the cell discard rate is equal to or less than 10–10. In addition, the delay time period is 68 cells or less, namely 185 μ sec in a transmission of 155.52 Mbps). It seems that such characteristics do not practically affect the operations of the network. In particular, with respect to the variation of delay time period, by using a control window area (equivalent to around 80 cells) provided in UNI, which will be described later, and by providing a circuit for compensating the variation of delay time period in a later stage of the switch, it is possible to usually accommodate cells in each frame.

Thus, the network equalization process can be accomplished in the network without necessities of priority control which does not need to distinguish the CBR cells and the VBR cells. While the frame intervals are required over the UNI, they are not always required in the network. Thus, it is necessary to determine whether or not to use the frame intervals from the standpoints of the compensation of the variation of the delay time periods, the compatibility with the STM system, and so forth.

Figure 9:
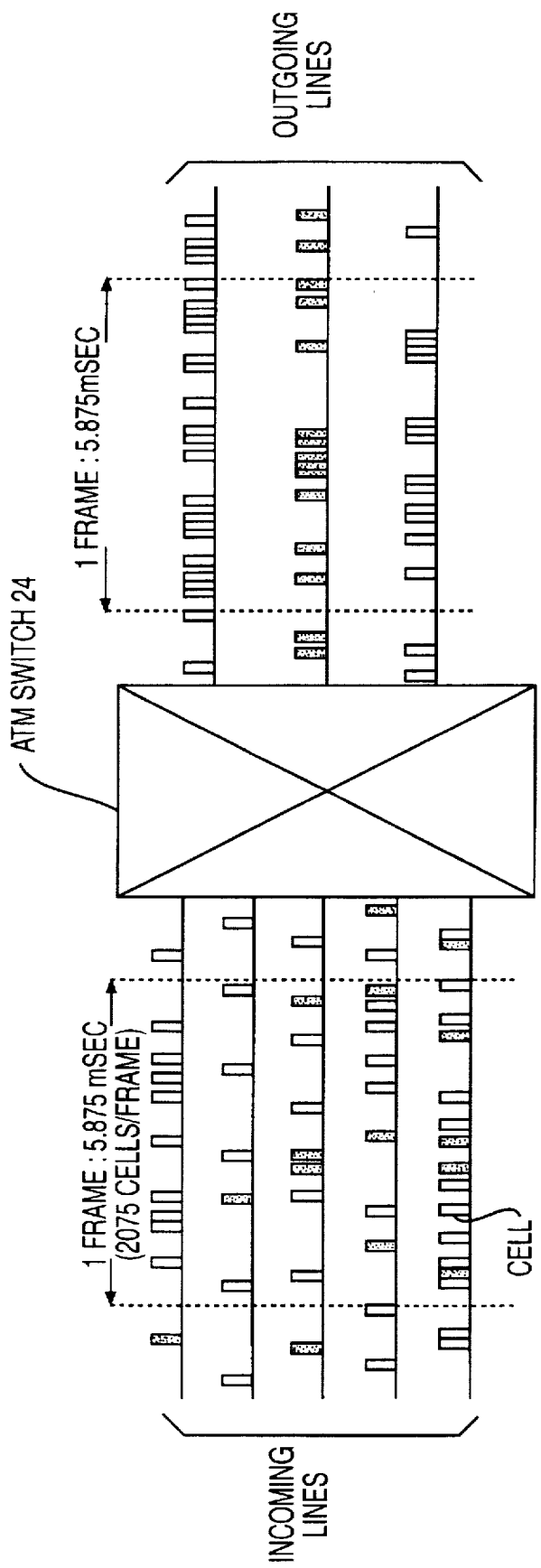
FIG. 9 is a schematic showing the state where cells are input to the ATM switch at random time intervals regardless of CBR, VBR, or MBR service through five input lines and then output from three output lines.

FIG. 9 is a schematic showing a state where cells are input to a ATM switch 24 at random intervals regardless of the CBR, the VBR, or the MBR service through five input lines and then output to three output lines.

As shown in the figure, ATM cells transmitted from the B-TE in each frame are input successively to the ATM switch 24 at random time periods. The ATM cells are output to each output line in the input order without much concentration. In this example shown in FIG. 9, the frame interval is 5.875 msec, which is the same as that of the above mentioned example. However, when the physical speed of the subscriber line interface is 155.52 Mbps, one frame can accommodate 2075 ATM cells. This number of cells is the size of the population enough to randomize the arrival intervals of the ATM cells. The frame interval of 5.875 msec is an enough time period for performing a process sequence such as calculating the number of cells required from the B-TE, assigning the number of cells permitted, and randomizing the transmission (arrival) intervals of the ATM cells by means of hardware logic (for example, numeric values of 1 to 2075 assigned at random are stored in ROM and then those being read in succession are set to the transmission positions of the cells in frames).

The calculation and the assignment of the number of cells can be satisfactorily processed by DSP provided for each VP.

Since the arrival intervals of the ATM cells are randomized, depending on the attributes of calls (for example, classes A and B), it is necessary to provide a buffer memory on the receiver side so as to compensate the variation of cell delay time periods which takes place due to the randomization and delay in the network. The amount of maximum variation is equivalent to approximately a time period of one frame. Even in an international communication where a call passes through a plurality of networks, at most the maximum variation is as small as 20 msec.

With respect to the variation of cell delay time periods, as was described earlier, by using the control window area (equivalent to approximately 80 cells) provided over the UNI and by proving the circuit for compensating the variation of call delay time period in the lower stage of the switch, cell can be always accommodated in each frame.

The arrival intervals of the ATM cells can be randomized in the following manners.

(1) When the subscriber line interface is used only by one B-TE (in the non-multi-point connection), a particular transmission timing of a plurality of ATM cells is randomized in each frame by using the buffer 13 and the controller 14 in the B-TE shown in FIG. 2.

(2) The subscriber line interface circuit in the broadband switch node is provided with a buffer memory (not shown in FIG. 3). When ATM cells are output from the interface circuit to the ATM switch, the cell intervals are randomized in the circuit not in the B-TE.

(3) The controller 22 in the subscriber line interface circuit 20 shown in FIG. 3 calculates the transmission timing where the cell intervals are randomized. The result is notified to each B-TE by using SOH (Section Over-Head) located at O & M (transmission Overhead for Maintenance) disposed in each subscriber line interface on the SDH (Synchronous Digital Hierarchy) base shown in FIG. 10, which is now being studied by CCITT, or on the cell base shown in FIG. 11. Each B-TE transmits the cells in the timing being notified.

With respect to the CBR cells, it is necessary to further study whether to randomize the transmission timings of the cells in each frame or to constantly assign the transmission timings upon setting of the call so that the cells are disposed in equal intervals in each frame. In the former, the generating mechanism of the random timings can be simplified. On the other hand, in the latter, the variation of cell delay time periods which takes place from end to end can be decreased.

Figure 10:
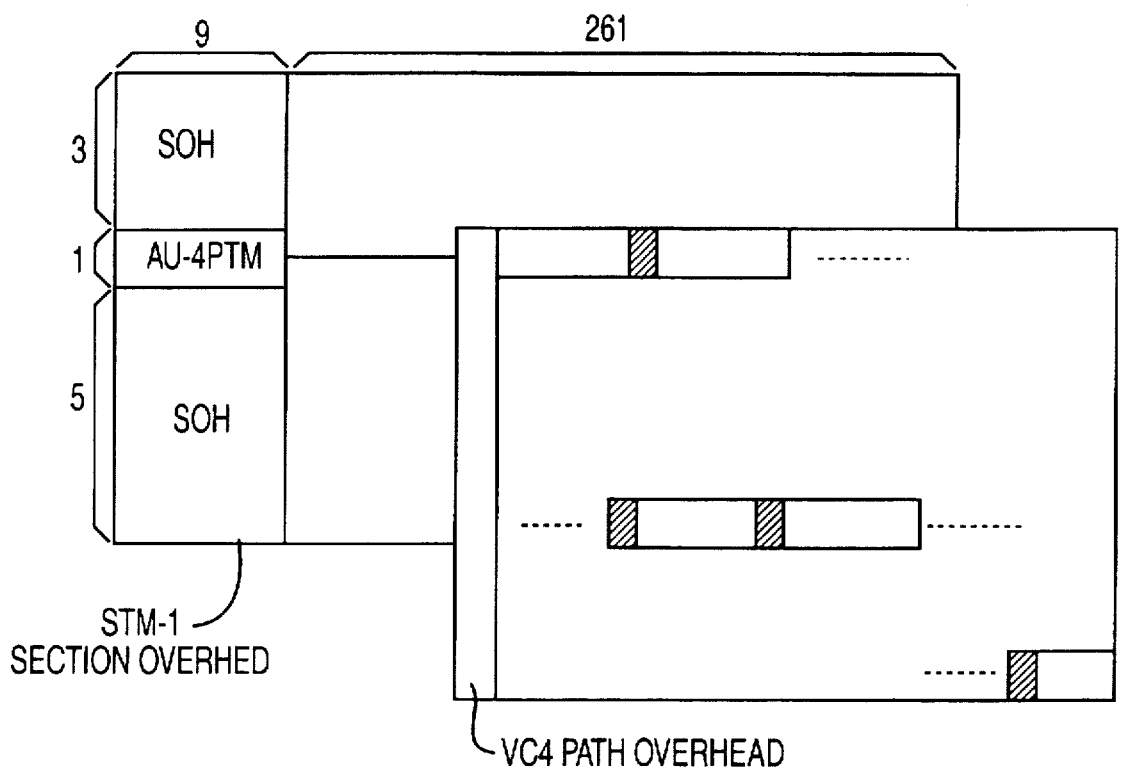
FIG. 10 is a schematic showing a SDH (Synchronous Digital Hierarchy)

FIG. 10 shows a case where the ATM cells are transmitted with SDH frames which are being studied by CCITT. As shown in the figure, each SDH frame is divided into a section area and a path area. The path area is composed of POH and an area for transmitting user information. The frame interval is 125 μ sec. The SOH and the POH in the section area is used for an OAM function (such as performance monitoring and alarming) over the NNI (Network to Network Interface). By using this area for notifying a subscriber terminal equipment of the number of cells which can be transmitted, the present invention can be applied to the ATM cell transmission on the SDH base. In this case, with the cell transmission timings which are randomized on the terminal side rather than those of which the network notifies the terminal side, not only the cell transmission control of short frame intervals of 125 μ sec can be accomplished, but cell transmission timings with a plurality of frames can be readily determined. In addition, with a plurality of SDH frames, the frame intervals of the cell transmission control according to the present invention can be formed. The SDH frame intervals constructing the frame intervals should be determined from the standpoints of the cell transmission control method, effective use of the network resources, and so forth.

Figure 11:
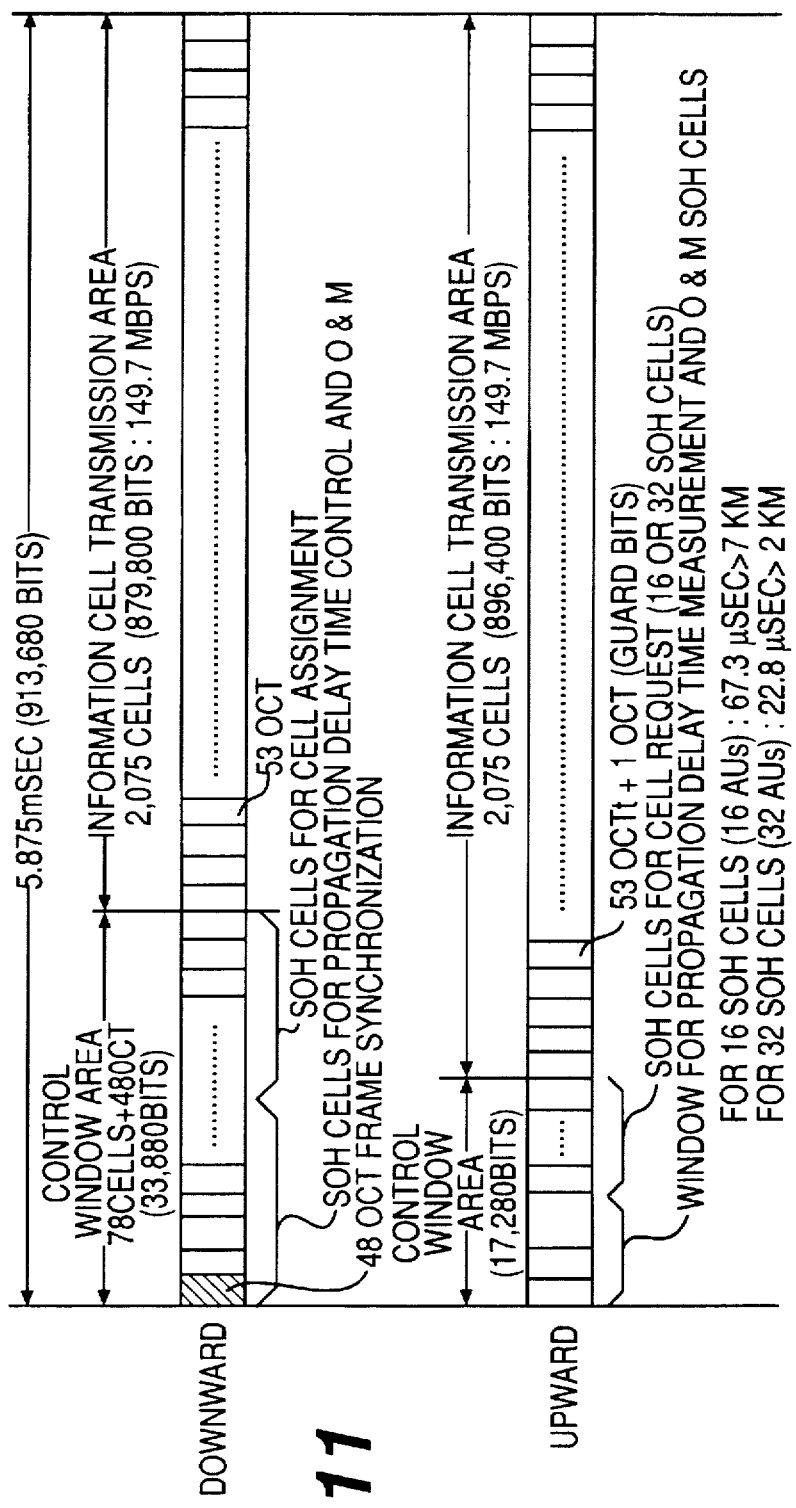
FIG. 11 shows schematics representing frames in multi-point connection by cell base interface.

FIG. 11 shows an example of an embodiment of the so-called multi-point connection service where a cell base subscriber line (or private system) interface is passively connected with a plurality of AUs (in the case of the subscriber line interface, the AUs have both functions of NT1 and NT2) through for example optical star couplers so as to share the same transmission media, each AU being connected to a plurality of TEs.

The frame interval of this embodiment is 5.875 msec, which is the same as that in the above mentioned example. The frame interval is composed of a control window area for transmitting SOH cells and an information cell area for transmitting conventional ATM cells with respect to both down link (cells are transmitted form the broadband switch node to the AU) and up link (cells are transmitted from the AU to the broadband switch node).

For each of the down link and the up link, the information cell transmission area can accommodate up to 2075 cells. However, on the up link side, a guard with 8 bits is provided between two successive ATM cells so as to prevent ATM cells from colliding with each other due to the multi-point connection and to establish the bit-synchronization of the ATM cells on the receiver side. In addition, on the down link side, a control window area which has up to 79 SOH cells (part of which are used for controlling the transmission delay time periods and for performing the O & M) is provided. On the other hand, on the up link side, a control window area which has 16 or 32 SOH cells for requesting the number of cells in accordance with the maximum number of multi-points (the number of AUs), SOH cells for measuring transmission delay time periods (which may have the O & M function), a window for measuring the transmission delay time periods (other than SOH cells for measuring the transmission delay time periods are not transmitted), and so forth are provided. The transmission delay time period measurement is used to measure two-way transmission time periods of ATM cells over the transmission path, which are necessary to compensate the delay time periods thereof. Beside s an example of a construction of the multi-point connection, since details of the access control are disclosed in Japanese Patent Application No. HEI 2-132188, they are not described in the following.

Figure 12:
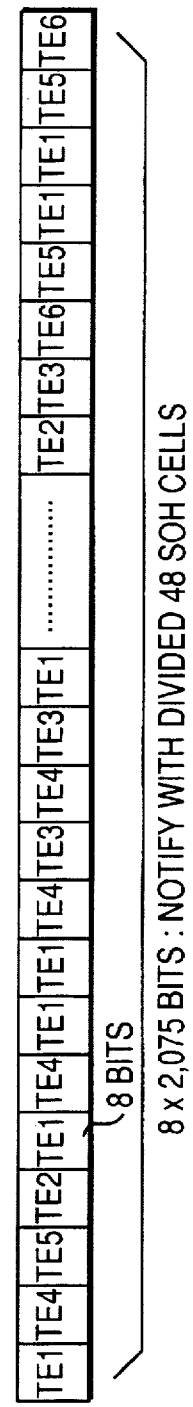
FIG. 12 is a schematic showing SOH cells in a control window area.

In such a construction, each AU requests the broadband switch node to permit the number of ATM cells to be transmitted, NRi, in the next frame for each of a plurality of TEs connected thereto by using the SOH cells for requesting particular cells. The broadband switch node obtains the number of cells to be permitted, Npi, for each TE in accordance with the above mentioned procedure. In addition, the broadband switch node randomizes the cell transmission timings over the entire interface so as to prevent the cells from colliding each other and then notifies each AU and each TE of the result in a bit map format by using the SOH cells for assigning cells on the down link side. On the up link side, an information field of the SOH cells for requesting the number of cells is 84 octets, which is the same as that of the conventional cells. However, when 8 bits are assigned for identifying each TE and 16 bits for describing the number of cells requested, the number of cells requested from 16 TEs or more can be expressed with one SOH cell. On the other hand, as shown in FIG. 12, when cells are assigned by the broadband switch node in the bit map format, if 8 bits are assigned for identifying each TE, an information length of 8×2075 bits is required in total. However, even if a CRC code and the like are added, when around 48 SOH cells are used, the above identification can be satisfactorily performed. In addition, when the number of AUs is 16, the window for measuring the transmission delay time periods on the up link side becomes 67.3 μ sec, which can cover the transmission path of up to 7 km in length. On the other hand, when the number of AUs is 32, the window for measuring the transmission delay time periods on the up link side becomes 22.8 μ sec, which can cover the transmission path of up to 2 km in length. The length of the transmission path of 7 km is the maximum length that the subscriber line interface can cover in the narrow band ISDN network or the like. On the other hand, the length of transmission path of 2 km is the maximum transmission path required in a local area network such as PBX.

As described above, the number of cells, Npi, which are transmitted from a TE is assigned by the network in accordance with the request issued therefrom. Thus, the network can always, accurately, and readily deal with the number of cells transmitted from each of TE and thereby precisely charging fees or measuring the traffic intensity, which will be described later.

Figure 20:
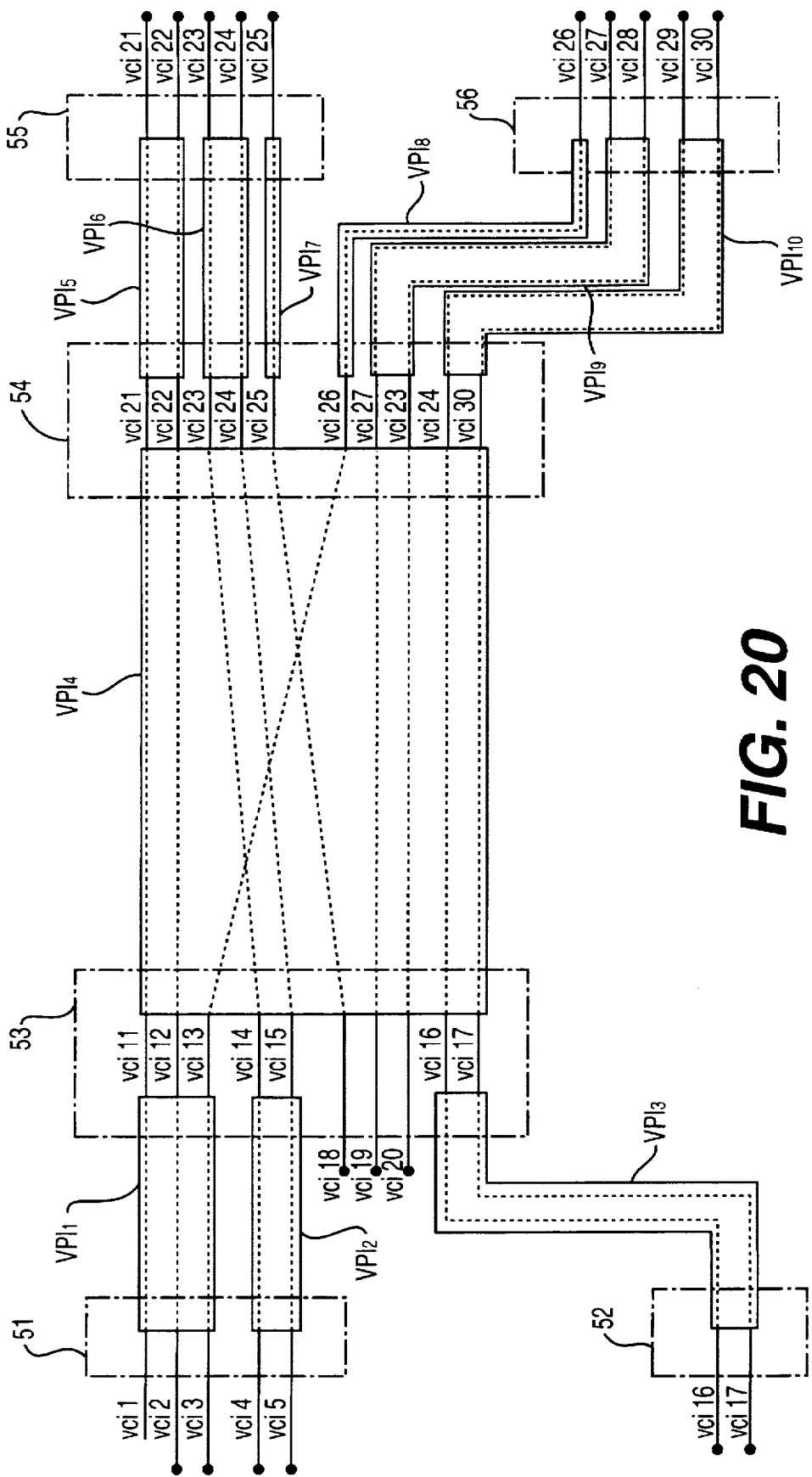
FIG. 20 is a schematic showing connections of a plurality of virtual paths routed between B-TEs through relay switches.

In the above mentioned description, the virtual path is routed between two nodes which terminate B-TEs. However, as shown in FIG. 20, when a plurality of virtual paths are disposed through tandem switches between B-TEs (from end to end), the following process can be performed.

In the figure (which represents only one direction where cells are transmitted from the left to the right), ATM switch nodes 51, 52, 55, and 56 function as local switch (LS) stations for terminating B-TEs, while ATM switch nodes 53 and 54 function as tandem switch (TS) stations for terminating and relaying virtual paths among the ATM switch nodes 51, 52, 55, and 56. In particular, the ATM switch node 53 also functions as a tandem local switch (TLS) station for terminating B-TE. The TS or TLS station is installed as a terminating station of a virtual path routed between long distance trunk line areas, for example, between Tokyo and Osaka. Thus, the TS and TLS stations differ from a cross connect node, which does not terminate a virtual path. Virtual paths VPI1 and VPI2 of the ATM switch node 51 accommodate virtual channels VCI1 to VCI3 and virtual channels VCI4 to VCI5, respectively. A virtual path VPI3 of the ATM switch node 52 accommodates virtual channels VCI6 and VCI7. The ATM switch node 53 which terminates and relays of virtual paths rewrites VCI and VPI in a cell header so as to convert VCI1 to VI5 accommodated in VPI1 into respective VCI11 to VCI15 and send them to a VPI4. Likewise, VCI6 and VCI7 accommodated in a VPI3 are converted into respective VCI16 and VCI17 and then relayed to the VPI4. In addition, the VPI4 accommodates VCI18 to VCI20 which are terminated by the ATM switch node 53. On the other hand, the ATM switch node 54 terminates the VPI4, converts the VCIII and VCI12 into respective VCI21 and VCI22, and relays them to a VPI6. In addition, the ATM switch node 54 converts the VCI18 into a VCI25 and relays it to a VPI7 so as to transmit each cell to the ATM switch node 55. Moreover, the ATM switch node 54 converts the VCI13 into a VCI26, and relays it to a VPI8. In addition, the ATM switch node 54 converts the VCI16 and VCI17 into respective VC129 and VCI30 and relays them to a VPI10 so as to transmit each cell to the ATM switch node 56.

In the above mentioned construction, the ATM switch node 51 assigns the number of cells for each frame with respect to the VCI1 and VCI2 (or B-TE) in the above mentioned manner (FIGS. 6 and 7) so that it does not exceed that which can be transmitted on the band of the VPI5 which has been registered in the switch node 51. Likewise, the number of cells for the VCI3 is assigned in accordance with the band of the VPI8 by each ATM switch node which accommodates them. The number of cells for the VCI4 and VCI5 is allocated in accordance with the band of the VPI6 by each ATM which accommodates them. After the number of cells are allocated, the transmission timings are randomized for each subscriber line interface accommodating each VCI or for each VPI.

When the number of cells is assigned in accordance with the above mentioned method, the band of VPI4 should be the same as or larger than the sum of the bands of VPI5 to VPI10. Likewise, the band of VPI1 should be the same as or larger than the sum of the bands of VPI5 and VPI8. Moreover, the band of VPI2 should be the same as or larger than the band of VPI1O. For example, with respect to the VPI4 which accommodate a large number of VPIs and is routed for a long distance, cells are not always transmitted in the full bands of VPIs. Thus, the band of VPI4 is more narrowed than the sum of the bands of VPI5 to VPI10. In other words, with the statistical multiplex in the virtual path level, the resources in the network can be more effectively used. Several methods for accomplishing the statistical multiplex in the virtual path level will be described in the following (it is assumed that only the band of VPI4 routed for a long distance is narrow so as to simplify the description).

As a first method, the number of cells which can be transmitted in the VPI4 has been assigned to the VCI1 to VCI5, VCI6 to VCI7, and VCI18 to VCI20. For example, the switch node 51 performs the statistical multiplex between the VPI1 and VPI2 so that the number of cells assigned for the VPI1 and VPI2 does-not exceed that of the sum of the VCI1 to VCI5.

As a second method, the number of cells to be transmitted in the next frame requested through the VCI1 to VCI7 and through the VCI8 to VCI20 is calculated by for example the switch node 53. When the number of cells which was calculated exceeds that which can be transmitted in the band of VPI4, the number of cells which can be transmitted are proportionally divided for the VPI5 to VPI10 as were described with reference to FIGS. 6 and 7. The switch node 53 notifies the ATM switch nodes 51 and 52 of the results. Thus, each of the switch node 51 and 52 assigns the number of cells requested from B-TE so that it does not exceed that being received from the switch node 53.

As a third method, the number of cells transmitted from for example the VPI4 is calculated by the switch node 54 for each of the VPI5 to VPI10. The switch node 54 estimates the state of traffic variation of each VPI in accordance with the calculated results, assigns the maximum number of cells which can be transmitted from each VPI on the order of seconds or minutes, and notifies the ATM switch nodes 51, 52, and 53 of the results. Each of the switch nodes 51, 52, and 53 assigns the number of cells which can be requested from B-TE so that it does not exceed that being received from the switch node 54.

As a fourth method, the number of cells which enter the network is calculated by the switch nodes 51, 52, and 53, which are entrances of the network or by the switch nodes 55 and 56, which are exits of the network. Each switch node notifies a management node (not shown in FIG. 20) of the calculated results. The management node estimates the state of traffic variation on the order of several ten minutes or several minutes, assigns the maximum number of cells which can be transmitted from each VPI, and then notifies the ATM switch nodes 51, 52, and 53 of the results. Each switch node assigns the number of cells requested from B-TE so that it does not exceed that being received from the management node.

In the first method, since a closed process is available for each switch node which terminates a B-TE, this method can be most readily accomplished. However, the first method is inferior to the second method with respect to effective use of the resources in the network. In the second method, since the statistical multiplex can be performed for each frame, the use efficiency of the resources (VPI4) in the network can be most improved. However, the number of cells which can be transmitted should be calculated for each frame and the notice with respect to the results should be sent to other nodes. Thus, a sequence of processes and notices should be performed and issued at a high speed. On the other hand, in the third and fourth methods, although the required speed is not higher than that of the second method, the use efficiency of the resources in the network is decreased. In particular, in the fourth method, since the management node can assign cells by considering the entire network, this method is effective when the construction of the network is complicated. Besides the above methods, other various methods such as a combination of the first method and the third method or the fourth method can be considered. However, as was described above, other methods are inferior to the second method to some extent with respect to the effective use of the resources in the network.

On the other hand, CCITT defines that even if the sum of virtual channels instantaneously exceeds the band of a virtual path due to statistical multiplex, the virtual path should satisfy the quality of services (QOS) for all the virtual channels. However, the method for accomplishing the above requirement is a subject to be studied in the future. In other words, only cells with low priority or with violation mark, that the network does not assure to transmit, are statistically multiplexed between virtual paths. Thus, the statistical multiplex is not positively used between virtual paths. In contrast, according to the present invention, all cells which enter the network can be statistically multiplexed between virtual paths. Thus, an instantaneous traffic variation can be absorbed (without necessity of changing the registration of the bands of virtual paths) and thereby the resources in the network can be effectively used.

Next, an embodiment of a call connection method for shortening a call connection time in computer communication will be described in focusing on the class C.

Figure 13:
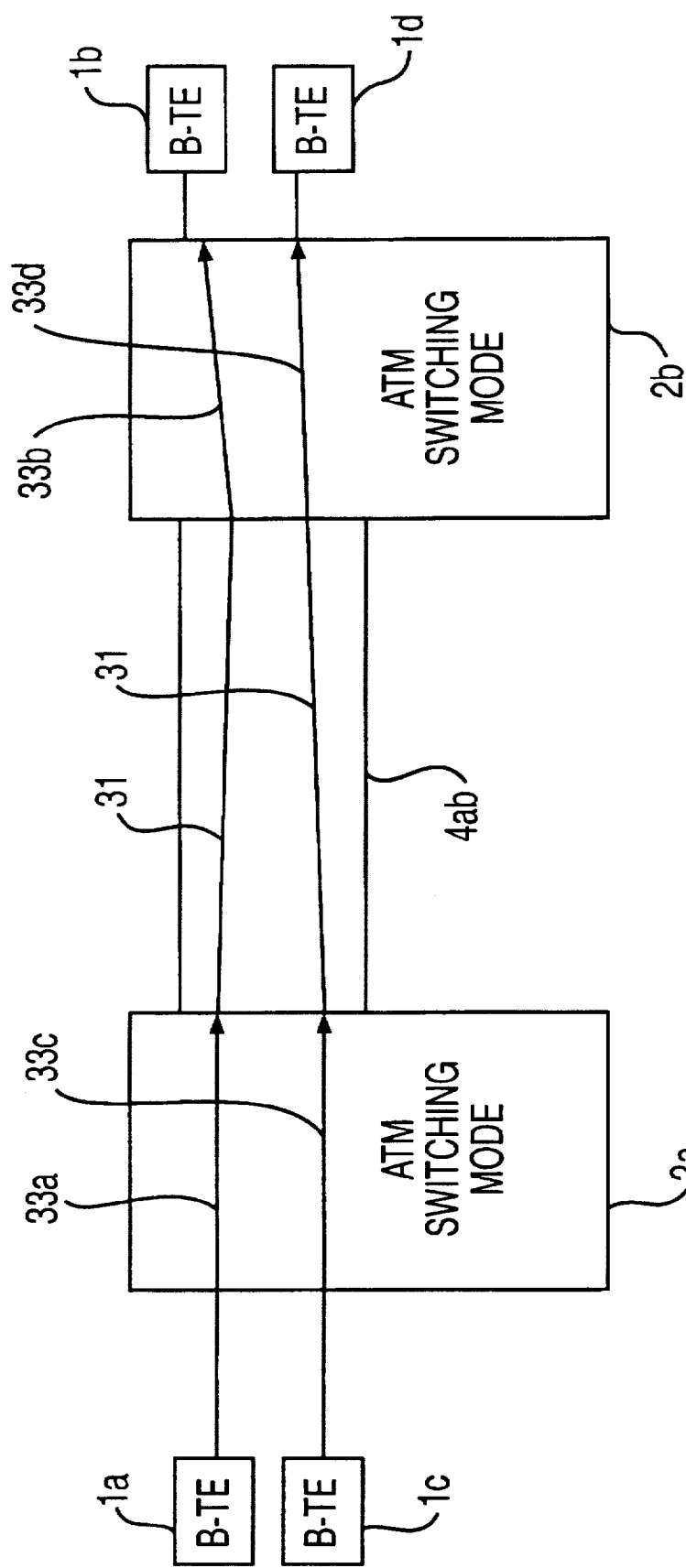
FIG. 13 is a block diagram showing an example of connections in accordance with the present invention.

FIG. 13 is a block diagram showing an example of connections according to the present invention.

B-TE 1a to 1d are connected to ATM switch nodes 2a and 2b through virtual channels 33a to 33d. The virtual channels have bands 31 over a virtual path 4ab routed between the ATM switch nodes 2a and 2b.

To simplify the description, the virtual channels and the virtual path only in one direction are described in the figure. However, actually, the virtual channels and the virtual path in the reverse direction are also routed. In addition, due to the same reason, a virtual path for controlling calls is also omitted in the figure.

Figure 14:
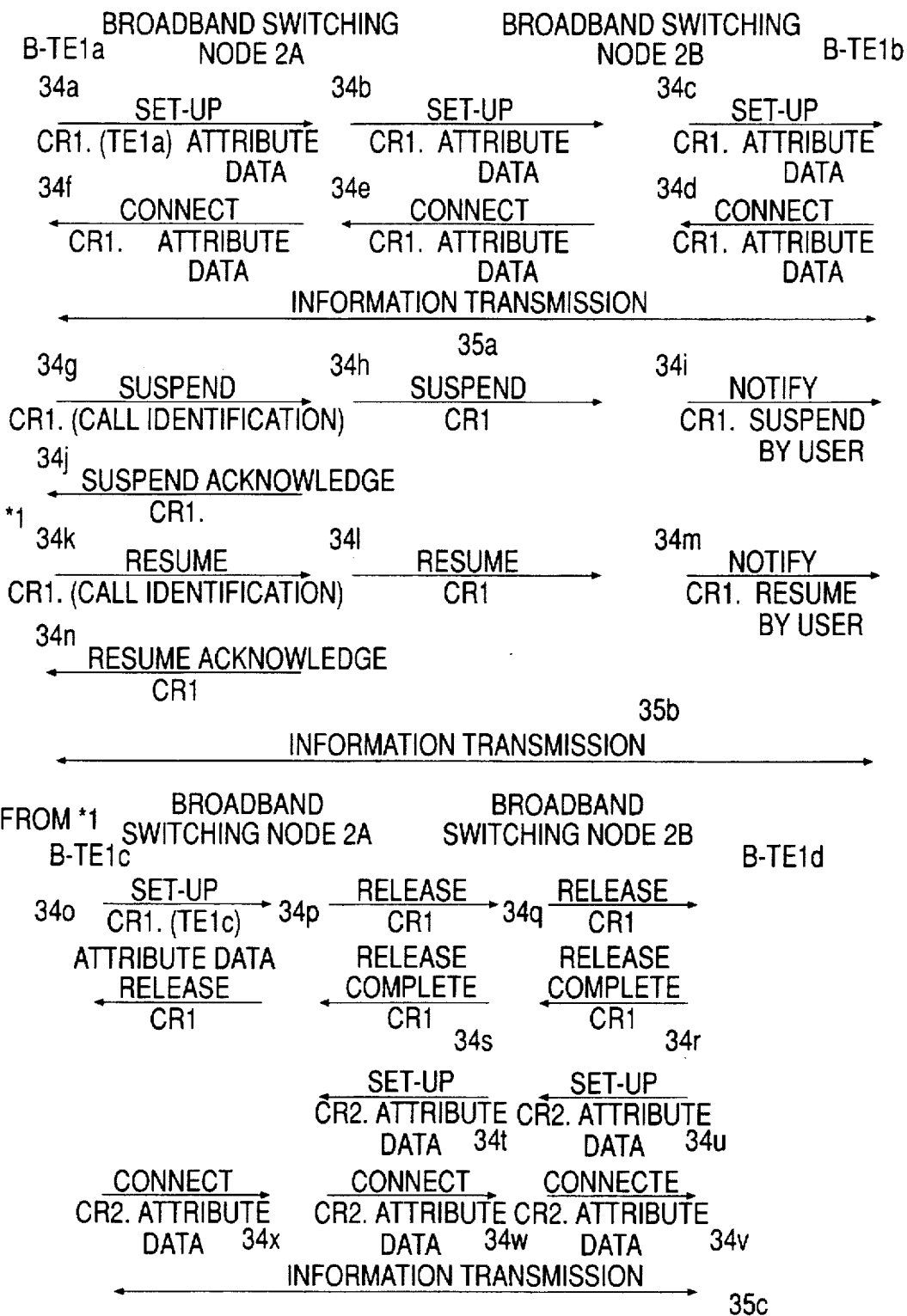
FIG. 14 is a schematic showing an example of a call control sequence in the connections shown in FIG. 13.

FIG. 14 is a schematic showing an example of a call control sequence in the above mentioned connections.

Reference numerals 34a to 34x represent call control signals for setting a data link. Reference numerals 35a to 35c represent information transmission processes which are made between two B-TEs.

FIG. 15 show examples of management tables 36ab and 36ba representing the relationship among a terminal equipment identifier TEIj of B-TE, a virtual channel identifier VCIk, transmission speeds Uc and Uv and so forth when a call number CRi against virtual paths 4ab and 4ba routed from the ATM switch node 2a to 2b and from 2b to 2a is used as a key.

When the call set request message 34a for setting a call from the B-TE 1a to the B-TE 1b is transmitted to the ATM switch node 2a, the switch node analyzes the call set request message 34a, which includes the above mentioned attribute data (the type of service (CBR, VBR, or MBR), transmission speed, class, and so forth) and then selects the corresponding virtual path 4ab. In addition, the switch node references the remaining band of the management table 36ab shown in FIG. 15 (a) with respect to the virtual path 4ab and checks whether or not the required transmission speed can be obtained. When the switch node determines that the required speed can be obtained, it assigns a call number CRi and a virtual channel identifier VCIj, registers the identification of the CBR service and/or the VBR service (in the case of a call which requests the MBR service, both CBR and VBR are registered for one call number), the corresponding transmission speeds Uc and Uv, class, and so forth on the management table 36ab, and then updates the remaining band.

Thereafter, the ATM switch node 2a transmits the call set message 34b to the ATM switch node 2b. Then, the switch node 2b transmits the call set request message 34c to the B-TE 1b. When the ATM switch node 2b receives the response message 34d from the B-TE 1b, it selects the virtual path 4ba routed from the B-TE 1b to the B-TE 1a in accordance with the attribute data contained in the response message (occasionally, the B-TE 1a may declare to select it). Thereafter, the ATM switch node 2b references the management table 36ba and registers required data such as VCIj by using the same call number CRi.

Thereafter, the response messages 34e and 34f are transmitted in succession to the B-TE 1a. Thus, the data link is established between the B-TE 1a and the B-TE 1b and thereby a communication ready state takes place.

After the data link is established, information transmission 35a is performed by the user. After the information has been transmitted, before next information is transmitted, the B-TE transmits the interrupt message 34g to the ATM switch node 2a.

When the interrupt message 34g is a call in the class C, the ATM switch node 2a writes on the management table 36ab the interrupt start time in the call state column with the call number and sends the interrupt message 34h to the ATM switch node 2b. In addition, the ATM switch node 2a writes the interrupt start time on the management table 36ba and sends to the B-TE 1b the notification message 34i for notifying it that the user interrupted the call and to the B-TE 1a the interrupt acknowledgement message 34j.

When the B-TE 1a sends the resumption message 34k to the ATM switch node 2a in such a state, the ATM switch node 2a clears the interrupt start time on the management table 36ab in accordance with the call number CRi. In addition, the ATM switch node 2a also clears the interrupt start time on the management table 36ba by means of the resumption message 34L and sends to the B-TE 1b the notification message 34m for notifying it that the user resumed the call and to the B-TE 1a the resumption acknowledgement message 34n. Thus, the information transmission process 35 is resumed between the users. Thereafter, the interrupt and the resumption of the call are repeated in the same procedure. When the ATM switch node 2a receives the disconnection message from a B-TE, it erases the registrations with respect to the call on the management tables 36ab and 36ba and then updates the remaining band thereof. On the other hand, when the ATM switch node 2a receives a new call set message 34o from another terminal equipment B-TE 1c, it references the management tables. After that, when the ATM switch node 2a determines that the remaining band is insufficient, it erases calls in the class C which have been interrupted in the order of older ones from the management tables in the sequence shown by reference numerals 34p to 34x of FIG. 14. Thus, the ATM switch node 2a obtains the required band and releases the erased calls from the tables.

On the other hand, when a B-TE which has interrupted a call receives another call from another B-TE, the ATM switch node erases the registrations with respect to the call on the management tables 36ab and 36ba, and sends the release message to the related B-TE. Thereafter, the former B-TE accepts the reception of a new call. When a B-TE which has interrupted a call sends another call to another B-TE, the ATM switch node erases the registrations with respect to the call which has been interrupted from the management tables and releases the erased call. Thereafter, the former B-TE originates the call. When a B-TE has interrupted a call for a long time and the call has been erased and released from the management tables due to the traffic condition of the network, if the B-TE repeats a call once again, the sequence of processes is repeated from the issuance of the call set request message.

FIGS. 16 and 17 show a sequence and management tables in the case where a disconnection message or release message is used instead of the interrupt message, respectively.

In FIG. 16, as shown by reference numerals 40a to 40x, disconnection messages or release messages are used instead of the interrupt messages. However, the sequence shown in FIG. 16 is basically the same as that of the conventional originating and terminating sequence.

An identifier TEIj of the party's terminal equipment instead of the call number is registered on management tables 37ab and 37ba shown in FIGS. 17 (a) and (b).

When the network receives a repeated call set request message 40m, it searches the management tables both on a calling side TEIi and a called side TEIj. When the registered content accords with the declared attribute data, the flow of the network immediately enters a call set process with the called side without a band obtaining process for the call.

In this embodiment, even if a terminal equipment transmits a disconnection message to the network, the network does not erase the registration data of the call. When another terminal equipment originates a call and the remaining band in the network becomes insufficient, the network erases registration data of calls in the same condition as described in the above mentioned embodiment.

Now, the ISCP (ISDN Signaling Control Part) signal system where the call control and the connection control are separated from the layer 3 will be described in the following.

Figure 22:
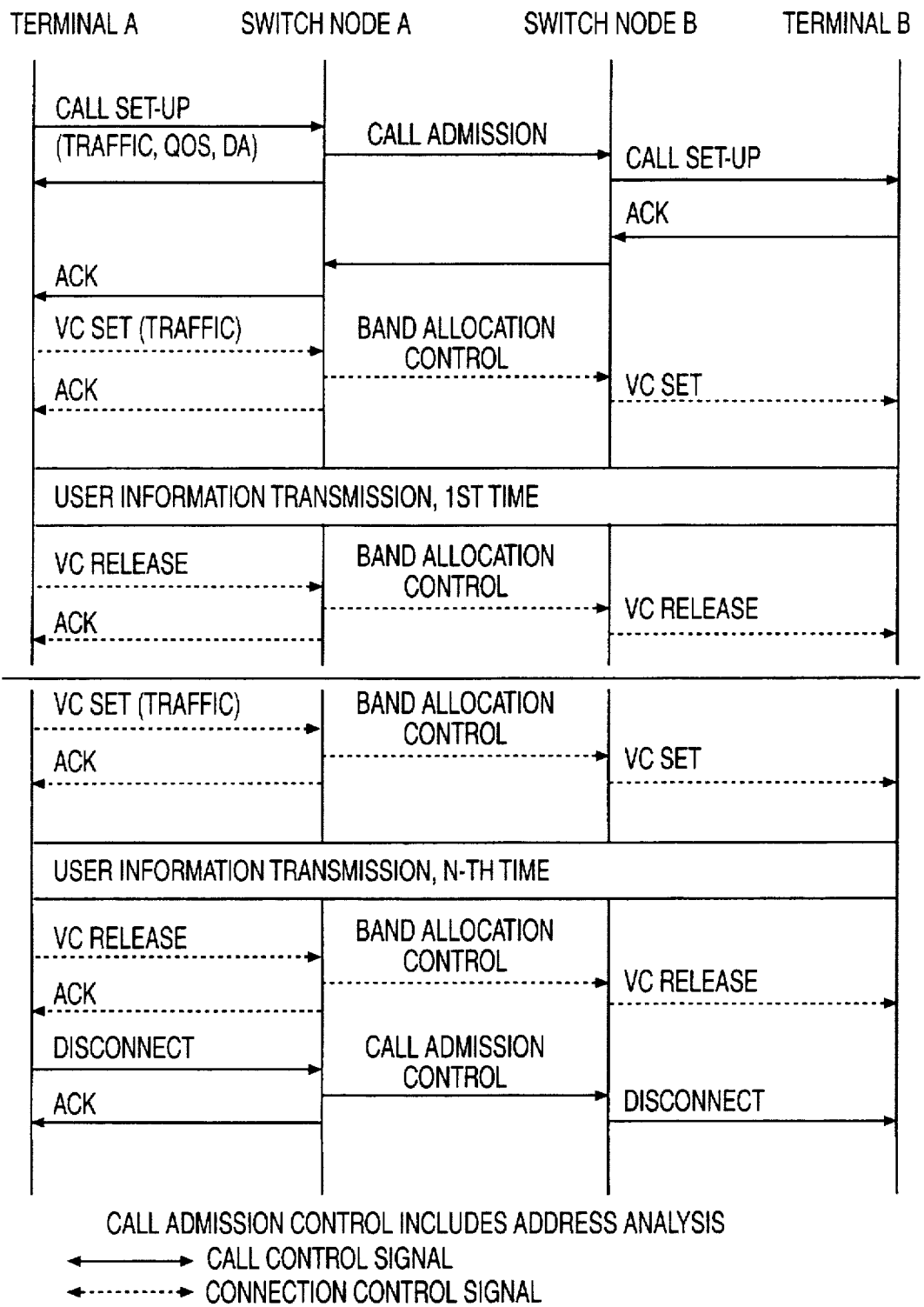
FIG. 22 is a sequence schematic showing a process in each phase by signaling of layer 3.

FIG. 22 is a sequence schematic showing a process in each phase by signaling of layer 3.

1. Call set request

The network performs a simple call acceptance control against a call set request and sets a call in accordance with the call acceptance control. Thereafter, the network registers the user connection information on a connection information management table. In the call set phase, the network routes the call in accordance with the E. 164 address. At that time, a real communication resource (band) is not held.

2. Connection set request

When a user transmits information, he or she requests the network to assign a resource (band). In the classes where information should be transmitted in real time, such as the class A (pseudo line switch) and the class B (variable length coded picture signal), the assignment of a resource will be performed in the call set phase. The network assigns the band in accordance with declared data such as peak speed and registers the band information on the connection information management table.

3. Connection interrupt request

When a user or a terminal equipment determines that information is not transmitted for the time being, he or (she) or it releases the resource while the call takes place and then registers the call state on the connection information management table so as to effectively operate the communication resource. The released resource may be used by a band assignment request by another call. In addition, irrespective of the class for use, the above mentioned process will be performed for a call which should be relayed.

When the number of calls to be transmitted exceeds that which can be relayed, the network releases the VC connections of calls with lower priorities from those which have been interrupted on the VC management table and erases them out of the management table. Thereafter, the network treats the call state of a call which is newly interrupted as the interrupt state and then notifies the switch node on the other user of the interrupt. On the other hand, the network notifies the user who requested to interrupt the call that it has accepted the interrupt so as to get ready for accepting a new call from the user. When the network requires a band due to a request from a user, it releases a VC which has been interrupted (erases it out of the management table) and then makes a new connection for the new call.

4. Connection resumption request

When the transmission of information is resumed from the connection interrupt state, with respect to the user or the terminal, the flow enters the information transmission phase. The network assigns a communication resource in accordance with the connection information management table and the band management information. When the communication resource (band) cannot be obtained, the network does not accept the resumption of the transmission and performs the standby process or the release process.

5. Release request

The user or the network releases a call when the communication is completed or when a particular call is released in the connection interrupt state.

In the present invention, so as to effectively use the communication resources, a new band management method which can assign a pool band besides a band with respect to a call is required.

Thus far, as the call acceptance control, various methods such as virtual band method and virtual line method have been known. For simplification, only the virtual band method will be described in the following.

A switch node has a connection state management table for managing the connection state of a call for each VP which is terminated thereby and a band management table for managing the band for each VP. Regardless of the call acceptance control method, as shown in FIG. 23, the connection management table has a call identification number such as a global call number, a set VCI number, a call type, and a time stamp. On the other hand, the band management table has a table storing a use band for each VP and the number of set VCs and the number of pool VCs for each call type as shown in FIG. 24 and virtual band data for each call type which is set through off-line as shown in FIG. 25.

Figure 26:
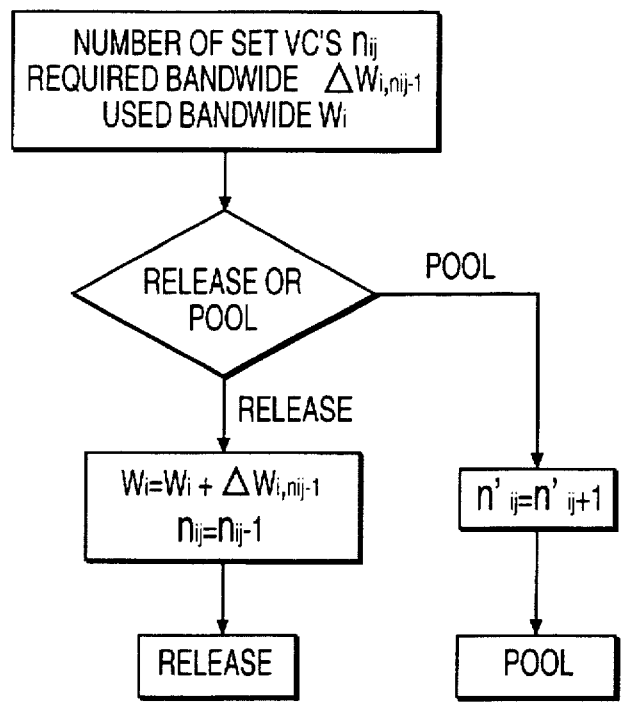
FIG. 26 to 28 are schematics showing an algorithm for controlling call acceptance.
Figure 27:
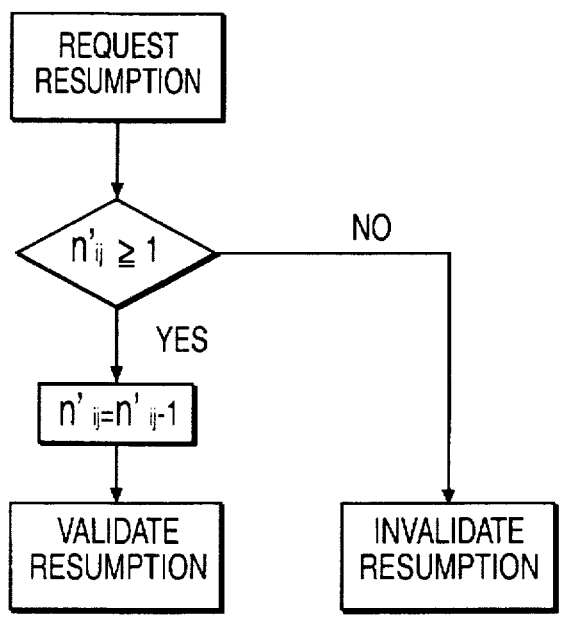
Figure 28:
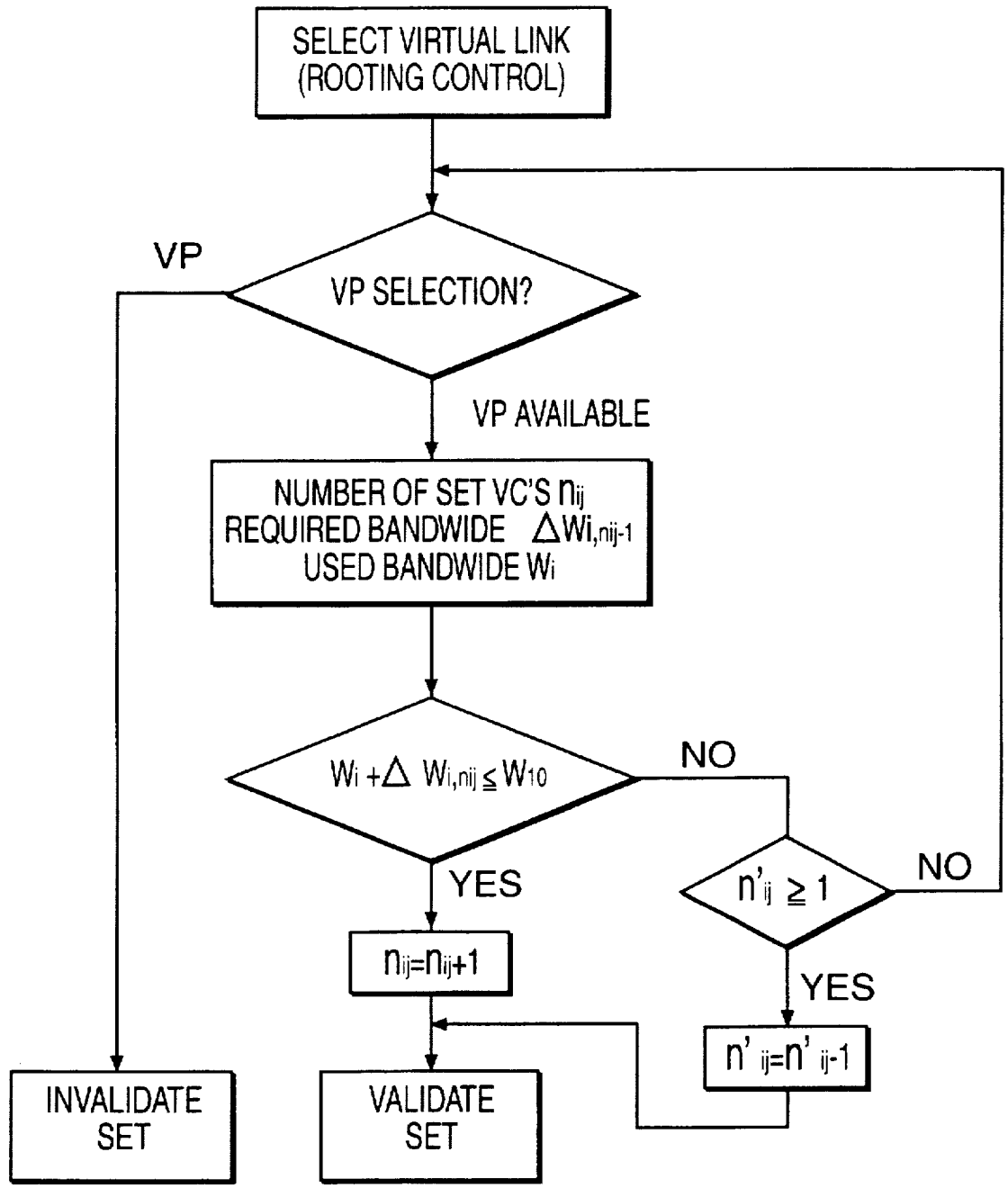

With reference to FIGS. 26, 27, and 28, an algorithm of the call acceptance control will be described in the following.

With respect to a conventional connection set, the network selects a VP and then determines the number of set VCs, the band for use, and the required band. When the conditions are satisfied, the network permits the connection With respect to a band pool, the network holds a virtual band as a using band as it is and increments the number of pool VCs.

When the pool band is resumed, the network determines whether or not to release it in accordance with the number of pool VCs for each call type.

When the traffic intensity in the VP becomes high and the band for use becomes insufficient, the band of the pool VC is assigned.

As was described above, communication resources are pooled on a particular table so as to promptly handle a resumption request. The band being pooled for a resumption request from a user is held in the next resumption phase so as to promptly resume the transmission of information.

However, when the traffic intensity in the network becomes high and the remaining band in the VP becomes insufficient, the band being pooled is used so as to accept a new call. Even if the remaining band is sufficient, when there is a call which is still interrupted for a particular time period, the network issues an alarm message or a disconnection message to a user and prompts him or her to release the call and the band so as to prevent the band from being improperly pooled.

Once the above processes are performed, information can be transmitted with a response equivalent to connection-less (at an inexpensive fee). In addition, from the standpoint of the network, call loss does not increase in the communication resources.

To further improve the use efficiency, when the value determined by the limitation including the internal memory and the like rather than time exceeds its threshold value, the network issues an alarm message or a disconnection message against a call which is newly accepted (connection) or discarded (connection) by using LRU (Least Recently Used) algorithm.

In the above mentioned embodiment where the interrupt message is used when a call has been registered on management tables, the transmission of information can be resumed in a very short time such as on the order of several msec or several ten msec. Thus, each user can use an inter-computer communication of the broadband ISDN network with a high response equivalent to connection-less, namely, without necessity of a waiting time. Moreover, in the broadband ISDN network, when the resources in the network become insufficient, since a band which is held for a call which has been interrupted, namely, a communication resource can be released to another user, the resources in the network can be effectively used. In addition, it is not necessary to charge a call which has been interrupted. Moreover, after a call is interrupted, even if the user leaves the terminal equipment and the call is not disconnected and released, when a predetermined time period elapses and the traffic intensity becomes high, the call is erased from the management tables and released from the network. Thus, it is not necessary to provide the management tables with too large a space. In other words, the users can inexpensively use services which are equivalent to connection-less system. In addition, the network can effectively use the resources thereof.

In the above description, the B-TE transmitted the interrupt message or the disconnection message to the network. However, it is also possible to transmit such a message by the consideration of each user. In addition, when a timer in the B-TE counts for example 1 minute after data is transmitted, the network can write the interrupt start time in the call state column of each management table so as to rapidly deal with the later call resumption. As another method, by considering the charging system for use, which will be described later (even if communication is completed within 1 minute, the path holding unit fee for 1 minute is charged), when information has not been transmitted, 1 minute after a call was set, the network can write the interrupt start time in the call state column of each management table so as rapidly deal with the later call resumption. Moreover, when the timer in the network counted a predetermined time period, the network can write the interrupt start time in the call state column of each management table so as rapidly deal with the later call resumption.

In the above description, the network wrote the interrupt start time on each management table and erased the registrations of calls from each table in the order of older ones. However, it is possible to provide priority order in accordance with the number of interrupt/resumption times in the past. In addition, by considering the effective use of the resources in the network, it is possible to provide priority order in accordance with transmission speeds or to affect user requests to the priority order.

Moreover, since the number of parameters for the above mentioned management tables was relatively large, table search will take a long time. However, by providing a plurality of tables with keys of call numbers, priority order, terminal equipment identifiers, and so forth, the load of process can be decreased and thereby particular resumption process can be more rapidly executed.

In the above description, when the remaining band in the virtual path became insufficient or when another call was attempted to be terminated to a particular B-TE, the registration of the call was erased. However, depending on the traffic condition in the network, it is also possible to erase calls which have been registered on each management table and which have been interrupted or disconnected when the band of another virtual path becomes insufficient or when a new virtual path is provided.

In the above description, one virtual path is provided between the ATM switch nodes 2a and 2b. However, when the virtual path was relayed with the plurality of nodes, by providing each node with the management tables, calls can be interrupted, resumed, and released in the same procedures as were described above.

In the above examples, the present invention was applied only to calls in the class C. However, it is obvious that the present invention can be applied to calls in other classes, namely, the class A, class B, and class D. In addition, the present invention can be also applied to the broadband ISDN networks, private branch exchanges (PBX), and the like besides the broadband ISDN networks.

To sum up, the aspect of the above mentioned embodiment is as follows. Communication resources are registered to particular management tables so that calls which have been interrupted or disconnected can be rapidly resumed or reconnected in accordance with the requests. Registrations of calls are erased from the management tables in accordance with the traffic condition or communication requests for other calls so as to release the resources. There will be many methods for accomplishing such an aspect. In this embodiment, the method for accomplishing the aspect is generically named the immediate connection service. Then, with reference to FIGS. 18 and 19, a charging system which is an important factor for inducing suitable uses of the resources in the broadband ISDN network and for stably and effectively operating the network will be described.

FIG. 18 shows a table representing fees by transmission rates for constant bit rate transmission and variable bit rate transmission.

In the constant bit rate transmission, when the number of cells transmitted per minute at a transmission speed Uc is represented with (1), it can expressed as follows.

$10^6 \times$ Uc Mbps/(48 octets$\times$8 bits)$\times$60 sec. When the Uc is 64 Kbps, 1 Mbps, 10 Mbps, and 100 Mbps, the transmission capacity becomes $10^4$ cells/min, $1.56 \times 10^5$ cells/min, $1.56 \times 10^6$ cells/min, and $1.56 \times 10^7$ cells/min, respectively. When the cell unit fee (2) for a short distance communication (the communication fee depends on the distance of communication), namely, the transmission fee per cell, is for example $\Psi 4 \times 10^{-4} \times$ Uc$^{-1/3}$. The communication time unit fee per minute (3) can be expressed by the product of the number of cells transmitted and the cell unit fee. In other words, the communication time unit price (3) per minute is in proportion to Uc$^{2/3}$. Thus, the communication fee is obtained by the unit fee times the communication time.

On the other hand, in the constant bit rate transmission, from the standpoint of the user, since the number of cells transmitted is controlled by the network, the service quality is low. In contrast, from the standpoint of the network, the communication resources can be effectively used. In addition, with computer communication, excessive call requests to the network and a long time holding of a virtual path can be suppressed. When the cell unit fee (5) is set to for example ¼th that of the constant bit rate transmission; the path holding time unit fee (6) is set to for example 1/10th that of the communication time unit fee (3) in the constant bit rate transmission; and the path holding time unit fee for one minute is charged for a call of less than 1 minute, then the sum of the number of cells transmitted times the cell unit fee (5) and the path holding time times the path holding time unit fee (6) becomes the communication fee to be charged.

FIG. 19 shows a table representing practical communication fees for the CBR service applicable for the classes A and D, the MBR service applicable for the classes B and D (assuming that overall transmission speed=Uc+Uv and Uc=Uv), and the VBR service applicable for the classes C and D.

As shown in the figure, in the CBR service, the communication fees at 64 Kbps, 1 Mbps, 10 Mbps, and 100 Mbps are $\Psi$ 10/min, $\Psi$ 62/min, $\Psi$ 290/min, and $\Psi$ 1345/min, respectively. With reference to the figure, even if the transmission speed is increased by 10 times, the communication fee is increased by around 4.6 times. Thus, the user can positively use the high speed communication services with which the broadband ISDN network is provided. In addition, in the above mentioned charging system, the network can prevent the user from declaring an unnecessarily high speed of transmission.

On the other hand, in the MBR service, where the traffic intensity always varies due to long holding time, in the assumption that the mean use rate in the variable bit rate transmission is denoted by η (the number of cells transmitted=the maximum number of cells transmitted$\times$η), at any transmission speed, when η=0.1, η=0.5, and η=1.0, the communication fees become more inexpensive by approximately 35%, 25%, and 15% than those in the CBR service, respectively. Thus, the MBR service will demand the user to properly declare a combination of the constant bit rate transmission and the variable bit rate transmission.

On the other hand, in the classes 3 and 4, where computer files and the like are mainly transmitted, when the file capacity is denoted by F Mbytes, the communication speeds to be declared with the most inexpensive fees at F=1 Mbytes, F=10 Mbytes, and F=100 Mbytes are 133 kbps, 1.3 Mbps, and 13 Mbps, respectively. All the file capacities of the files take approximately 1 minute to transmit.

It is possible to decrease the file transmission time on the order of several seconds by declaring the transmission speed ten times higher than each of above files. At that time, the increases of the communication fees are only at most 10 to 30%. On the other hand, when the transmission speed 10 times faster than the above is declared (the files can be transmitted on the order of 1 sec or less), the communication fees will be increased by 4 times or more. Thus, the cost performance from the standpoint of the users will be remarkably decreased. In other words, when the user can withstand a communication time for approximately 1 minute, he or she can most inexpensively transmit a file. On the other hand, when the user wants to transmit a file over a man-machine interface within several seconds, the communication fee will be increased only by approximately 10 to 30%. However, when a file is transmitted at a very high speed or a very slow speed, the communication fee will be adversely increased. Thus, the user is induced to declare a moderate transmission speed.

In FIG. 18, as was described earlier, while the file capacity F is divided by 48 octets, which are the information field length of ATM cells, CCITT is now considering that the length of the SDU area in the classes C and D is 44 octets. Thus, from the standpoint of the transmission capacity of the SDU, no problem will take place.

Moreover, in the above description, the practical calculation expressions were exemplified in such that the cell unit fee in the constant bit rate transmission was in proportion to Uc$^{-1/3}$. However, the present invention is not limited to such calculating expressions. Rather, combinations of various coefficients can be considered. In addition, in the above description, the cell unit fee in the constant bit rate transmission was the same as that in the variable bit rate transmission regardless of the classes and service types. Rather, it is possible to set the cell unit fees by the classes and by the service types. In other words, since the present invention is characterized in that the CBR service, the VBR service, and the MBR service are provided to the user; the user declares a transmission speed of the desired service; the cell unit price according to a transmission speed determined between the user and the network, the communication time unit fee, and the path holding time unit fee are defined so that the user can use a proper resource in the network; and the fee in accordance with the number of cells actually transmitted, the communication time, the path holding time, and communication distance is charged to the user. Thus, many calculating expressions are satisfied in the above mentioned scope.

As was described above, according to the broadband switching networks of the present invention, with flow control performed cooperatively by the network and terminal equipments, excessive cells do not enter the network and thereby prevent cell discard from taking place in the network.

In addition, by randomizing arrival intervals of cells which enter the network (or an ATM switch), the burstiness of cells disappears and thereby remarkably reduces the storage capacity of the buffer of the ATM switch. In addition, the variation of cell delay can be remarkably reduced.

In addition, since no cell discard basically takes place, it is always not necessary to assign for each cell a cell sequence number in information field by the ATM adaptation layer unlike the related art. Thus, the transmission speed of user information can be increased so as to effectively use the resources in the network.

Moreover, by providing a transmission service in constant bit rate transmission, a transmission service in variable bit rate transmission for effectively using statistical multiplex effect characterized by the ATM, and a transmission service which is a combination of both the services suitable for transmitting pictures and the like, the user only needs to declare a transmission speed thereof instead of a combination of complicated attribute parameters unlike the related art. Thus, since it is not necessary to cause the network to unilaterally restrict service items, the flexibility, which is the most important aspect of the broadband ISDN network, is not lost and the network can be widely used for various user needs in the future.

Furthermore, the present invention also proposes a practical system for accomplishing the flow control and the randomization of cell arrival with respect to a multi-point connection service, which is a subject to be defined by CCITT in future. Thus, according to the present invention, with the same communication medium, communication with high efficiency can be provided.

In addition, for calls which have been interrupted or disconnected, the related communication resources are registered on management tables so as to quickly handle repeated call set request. In accordance with the traffic condition and other call requests, the communication resources are erased and released from the management tables. Thus, according to the present invention, services with the same quality as connection-less services can be provided. Besides inter-LAN connections in the class D, which are mostly used by large companies, the present invention provides remarkable benefits to communications using personal computers and the like. Thus, the communication resources in the network can be effectively used.

Moreover, since the present invention provides practical calculating methods for cell unit fees for transmission speeds, communication time unit fees, path holding time unit fees in accordance with service systems, it promotes the users to use proper communication resources in the network, while preventing other users from being adversely affected by false declaration. In addition, according to the present invention, the network can be effectively operated.

Furthermore, according to the present invention, neither polling function nor priority control is required in the network unlike the related art. Thus, the call acceptance control is simplified. Further, switch nodes or cross-connect nodes constructing the broadband ISDN networks or broadband industrial information communication networks can be readily developed.

What is claimed is:

1. A broadband switching network having a plurality of broadband switch nodes and a plurality of broadband switch inter-node transmission lines for connecting said plurality of broadband switch nodes, information being transmitted by cells of fixed length, each of said cells comprising a header and an information field, each of said broadband switch nodes comprising:

a plurality of broadband input and output ports for transmitting and receiving said cells to and from other broadband switch nodes using said broadband inter-node transmission lines;

a plurality of user interfaces to allow said cells to be transmitted and received from end users;

switching means for demultiplexing said cells entering the nodes from either said other switching nodes or said end users, and multiplexing said cells for transmission to either said other switching nodes or said end users according to said header field of each said cell; and wherein said broadband switching network is arranged to perform a cell flow control such that said end users request a desired transmission speed of said cells to be transmitted to said network through said user interfaces, with flow control periodically performed by the network informing said end users of an individual permissible transmission speed in accordance with said requested transmission speed and characteristics and level of traffic within said network.

2. The broadband switching network as set forth in claim 1, wherein said flow control is arranged to transmit the number of cells which can be transmitted per unit time through one or more virtual paths routed between terminating broadband switch nodes.

3. The broadband switching network as set forth in claim 1, wherein a transmission speed defined by said flow control is defined by the number of cells transmitted in a unit time interval.

4. The broadband switching network as set forth in claim 1, wherein said flow control is performed with each individual user over a shared multi-point multi-user cell-based line interface.

5. The broadband switching network as set forth in claim 4, wherein each of said cells is inserted in respective ones of time slots in accordance with a result of transmission delay time measurement, such that any two cells of any two users make no collision.

6. A broadband switching network having a plurality of broadband switch nodes and a plurality of broadband switch inter-node transmission lines for connecting said plurality of broadband switch nodes, information being transmitted by cells of fixed length, each of said cells comprising a header and an information field, each of said broadband switch nodes comprising:

a plurality of broadband input and output ports for transmitting and receiving said cells to and from other broadband switch nodes using said broadband inter-node transmission lines;

a plurality of user interfaces to allow said cells to be transmitted and received from end users; and switching means for demultiplexing said cells entering the nodes from either said other switching nodes or said end users, and multiplexing said cells for transmission to either said other switching nodes or said end users according to said header field of each said cell, wherein said cells of a same virtual channel or virtual path entering said network have random intervals between cell transmissions or are transmitted with random timings.

7. The broadband switching network as set forth in claim 6, wherein the random cell transmission intervals or cell transmission timings are determined by said network.

8. The broadband switching network as set forth in claim 7, wherein the random cell transmission intervals or cell transmission timings are determined by said network for each individual user over a shared multi-point multi-user cell-based line interface.

9. The broadband switching network as set forth in claim 8, wherein each of said cells is inserted in respective ones of time slots in accordance with test results data on cell transmission delay time test, such that any two cells of any two users make no collision and have least expansion.

10. An interface adapter for use in coupling a terminal equipment of a user with a broadband switching network having a plurality of broadband switch nodes and a plurality of broadband switch inter-node transmission lines for connecting said plurality of broadband switch nodes, information being transmitted by cells of fixed length, each of said cells comprising a header and an information field, each of said broadband switch nodes comprising a plurality of broadband input and output ports for transmitting and receiving said cells to and from other broadband switch nodes using said broadband inter-node transmission lines; a plurality of user interfaces to allow said cells to be transmitted and received from end users through said interface adapter; and switching means for demultiplexing said cells entering the nodes from either said other switching nodes or said end users, and multiplexing said cells for transmission to either said other switching nodes or said end users according to said header field of each said cell; and wherein said interface adapter is adapted in cell flow control, such that said end users of said terminal equipment request a desired transmission speed of said cells to be transmitted to said network therethrough, said flow control being periodically performed by the network informing said interface adapter of an individual permissible transmission speed in accordance with said requested transmission speed and characteristics and level of traffic within said network.

* * * * *